(12) United States Patent
Creasman et al.

(10) Patent No.: US 11,536,894 B2
(45) Date of Patent: Dec. 27, 2022

(54) MODULAR WAVEGUIDES AND FIXTURES UTILIZING SAME

(71) Applicant: IDEAL Industries Lighting LLC, Durham, NC (US)

(72) Inventors: Ethan Creasman, Raleigh, NC (US); Randy Bernard, Cary, NC (US); Dana Deskiewicz, Raleigh, NC (US); Nathan Snell, Raleigh, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 5 days.

(21) Appl. No.: 15/890,272

(22) Filed: Feb. 6, 2018

(65) Prior Publication Data

US 2018/0224596 A1 Aug. 9, 2018

Related U.S. Application Data

(60) Provisional application No. 62/455,422, filed on Feb. 6, 2017.

(51) Int. Cl.
*F21V 8/00* (2006.01)
*F21V 17/00* (2006.01)
(Continued)

(52) U.S. Cl.
CPC .............. *G02B 6/0091* (2013.01); *F21S 8/06* (2013.01); *F21V 3/00* (2013.01); *F21V 17/002* (2013.01);
(Continued)

(58) Field of Classification Search
CPC .. G02B 6/0075; G02B 6/0078; G02B 6/0091; F21V 17/002
See application file for complete search history.

(56) References Cited

U.S. PATENT DOCUMENTS 3,532,871 A 10/1970 Shipman
5,613,751 A 3/1997 Parker et al.
(Continued)

FOREIGN PATENT DOCUMENTS

WO 2014120971 A1 8/2014
WO 2014145283 A1 9/2014

OTHER PUBLICATIONS

Non-Final Office Action for U.S. Appl. No. 16/101,182, dated May 29, 2020, 8 pages.
(Continued)

*Primary Examiner* — Sean P Gramling
(74) *Attorney, Agent, or Firm* — Withrow & Terranova, P.L.L.C

(57) ABSTRACT

According to an aspect of the present disclosure, a luminaire comprises a housing and at least one waveguide comprising first and second opposite waveguide ends, a coupling portion disposed at the first waveguide end, and a light emitting portion disposed between the first and second waveguide ends. The luminaire is further arranged such that the first waveguide end is disposed adjacent a first luminaire end and the second waveguide end is disposed at a second luminaire end opposite the first luminaire end. Still further, the luminaire comprises at least one LED element disposed within the housing adjacent the coupling portion of the at least one waveguide such that the at least one waveguide provides a first illumination pattern and the at least one waveguide is interchangeable with another waveguide that provides a second illumination pattern.

22 Claims, 30 Drawing Sheets

(51) Int. Cl.
  *F21S 8/06* (2006.01)
  *F21V 3/00* (2015.01)
  *F21Y 115/10* (2016.01)
  *F21Y 103/10* (2016.01)

(52) U.S. Cl.
  CPC ......... *G02B 6/0068* (2013.01); *G02B 6/0088* (2013.01); *F21Y 2103/10* (2016.08); *F21Y 2115/10* (2016.08); *G02B 6/009* (2013.01); *G02B 6/0046* (2013.01); *G02B 6/0051* (2013.01); *G02B 6/0078* (2013.01)

(56) References Cited

U.S. PATENT DOCUMENTS

| | | | |
|---|---|---|---|
| 5,812,714 A | 9/1998 | Hulse | |
| 5,897,201 A | 4/1999 | Simon | |
| 7,083,313 B2 | 8/2006 | Smith | |
| 7,520,650 B2 | 4/2009 | Smith | |
| 8,430,548 B1 | 4/2013 | Kelly et al. | |
| 8,506,112 B1 | 8/2013 | Dau et al. | |
| 8,541,795 B2 | 9/2013 | Keller et al. | |
| 8,975,827 B2 | 3/2015 | Chobot et al. | |
| 9,366,799 B2 | 6/2016 | Wilcox et al. | |
| 9,581,750 B2 | 2/2017 | Wilcox et al. | |
| 9,666,744 B2 * | 5/2017 | Clements | G02B 6/0075 |
| 9,709,725 B2 | 7/2017 | Wilcox et al. | |
| 9,818,919 B2 | 11/2017 | Lowes et al. | |
| 9,835,317 B2 | 12/2017 | Yuan et al. | |
| 9,841,154 B2 | 12/2017 | Sorenson et al. | |
| 9,869,432 B2 | 1/2018 | Keller et al. | |
| 9,952,372 B2 | 4/2018 | Wilcox et al. | |
| 10,278,250 B2 | 4/2019 | McBryde et al. | |
| 10,379,278 B2 | 8/2019 | Wilcox et al. | |
| 10,422,939 B2 | 9/2019 | Farsa et al. | |
| 10,502,899 B2 | 12/2019 | Wilcox et al. | |
| 2008/0037284 A1 | 2/2008 | Rudisill | |
| 2012/0287671 A1 * | 11/2012 | Parker | F21S 2/005 362/609 |
| 2013/0039050 A1 * | 2/2013 | Dau | F21V 7/0033 362/217.05 |
| 2013/0208495 A1 * | 8/2013 | Dau | F21V 7/0008 362/551 |
| 2014/0313776 A1 * | 10/2014 | Grigore | G02B 6/0078 362/612 |

OTHER PUBLICATIONS

Final Office Action for U.S. Appl. No. 16/101,182, dated Nov. 12, 2020, 9 pages.
Advisory Action for U.S. Appl. No. 16/101,182, dated Jan. 14, 2021, 3 pages.
Non-Final Office Action for U.S. U.S. Appl. No. 16/101,182, dated Feb. 11, 2021, 9 pages.
Notice of Allowance for U.S. Appl. No. 16/101,182, dated May 21, 2021, 10 pages.

* cited by examiner

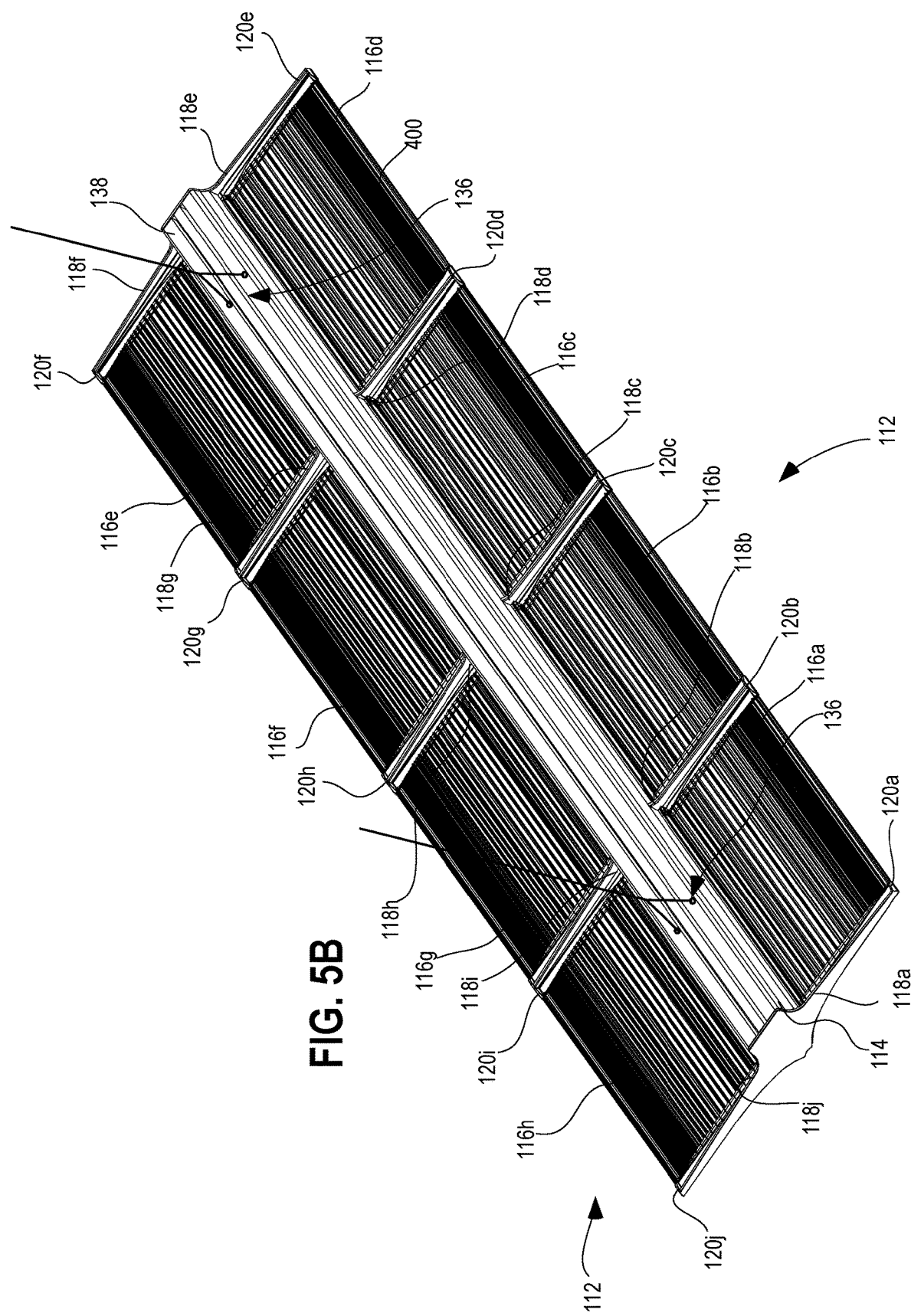

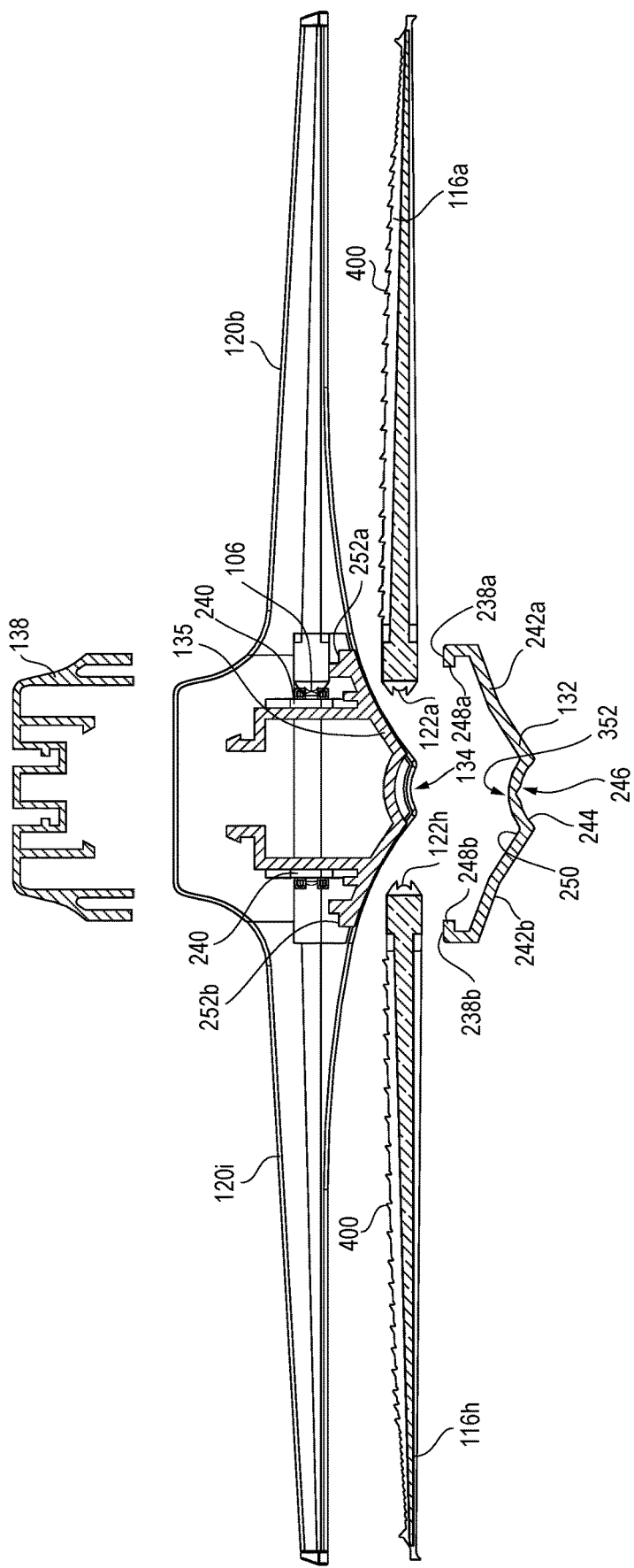

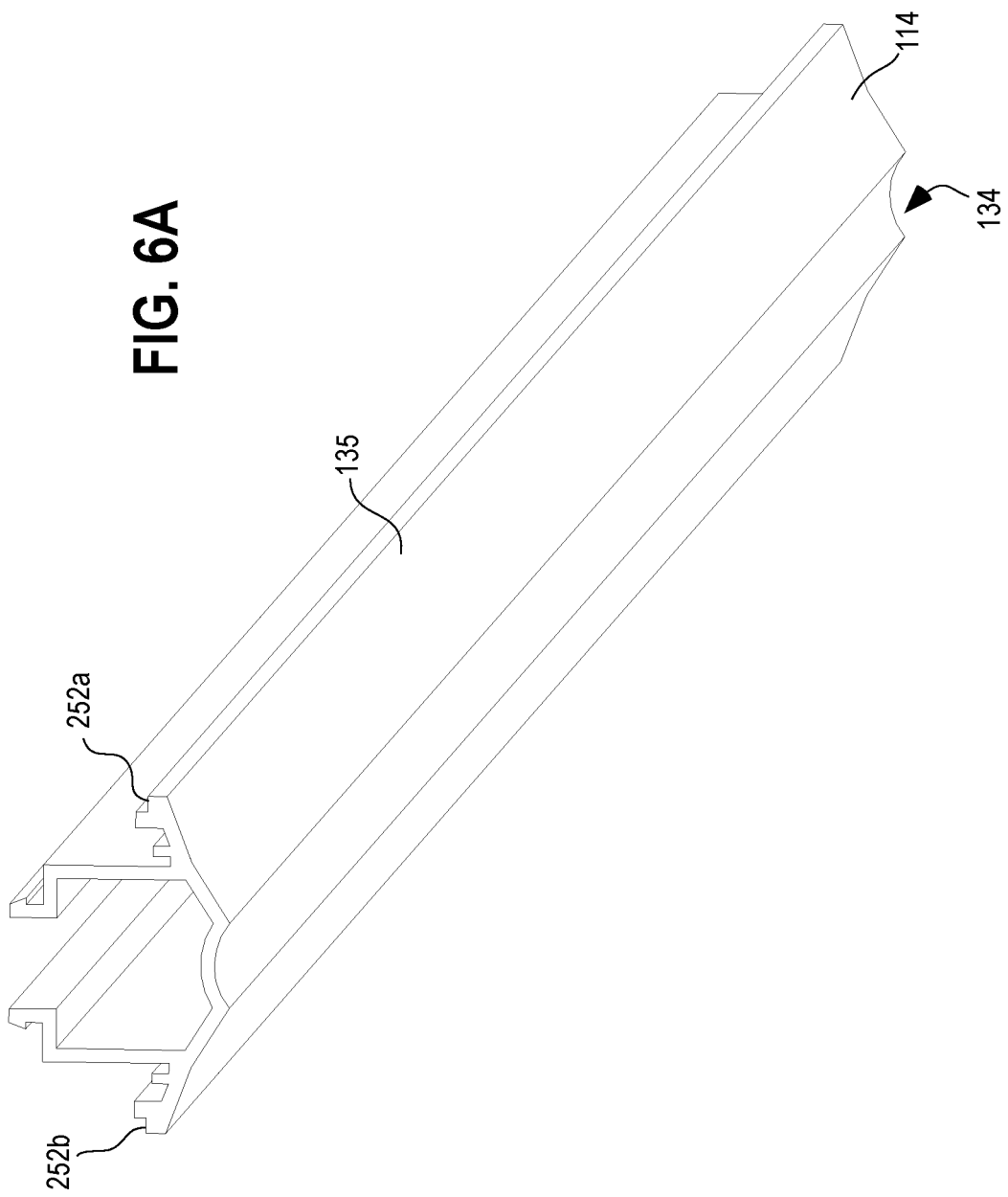

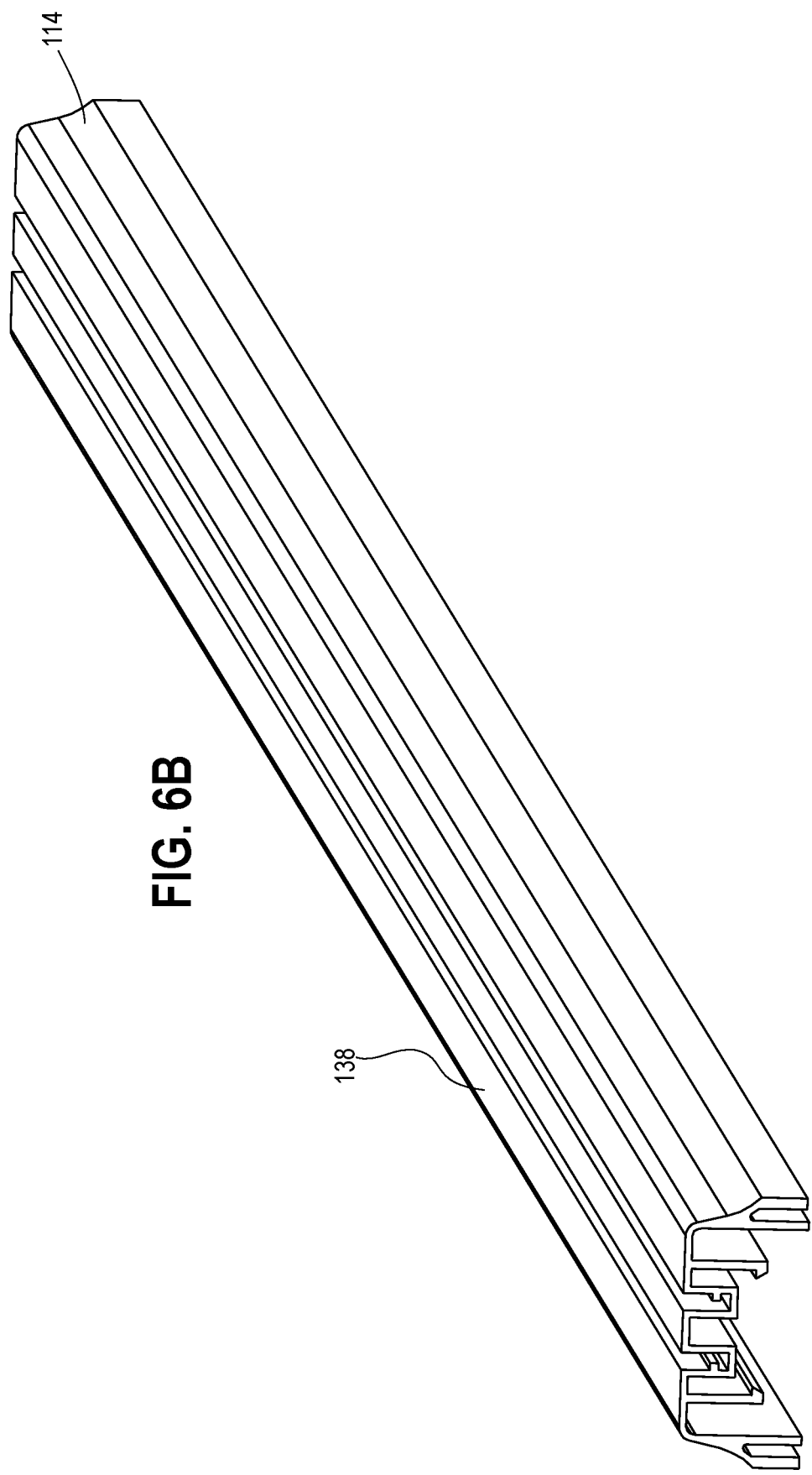

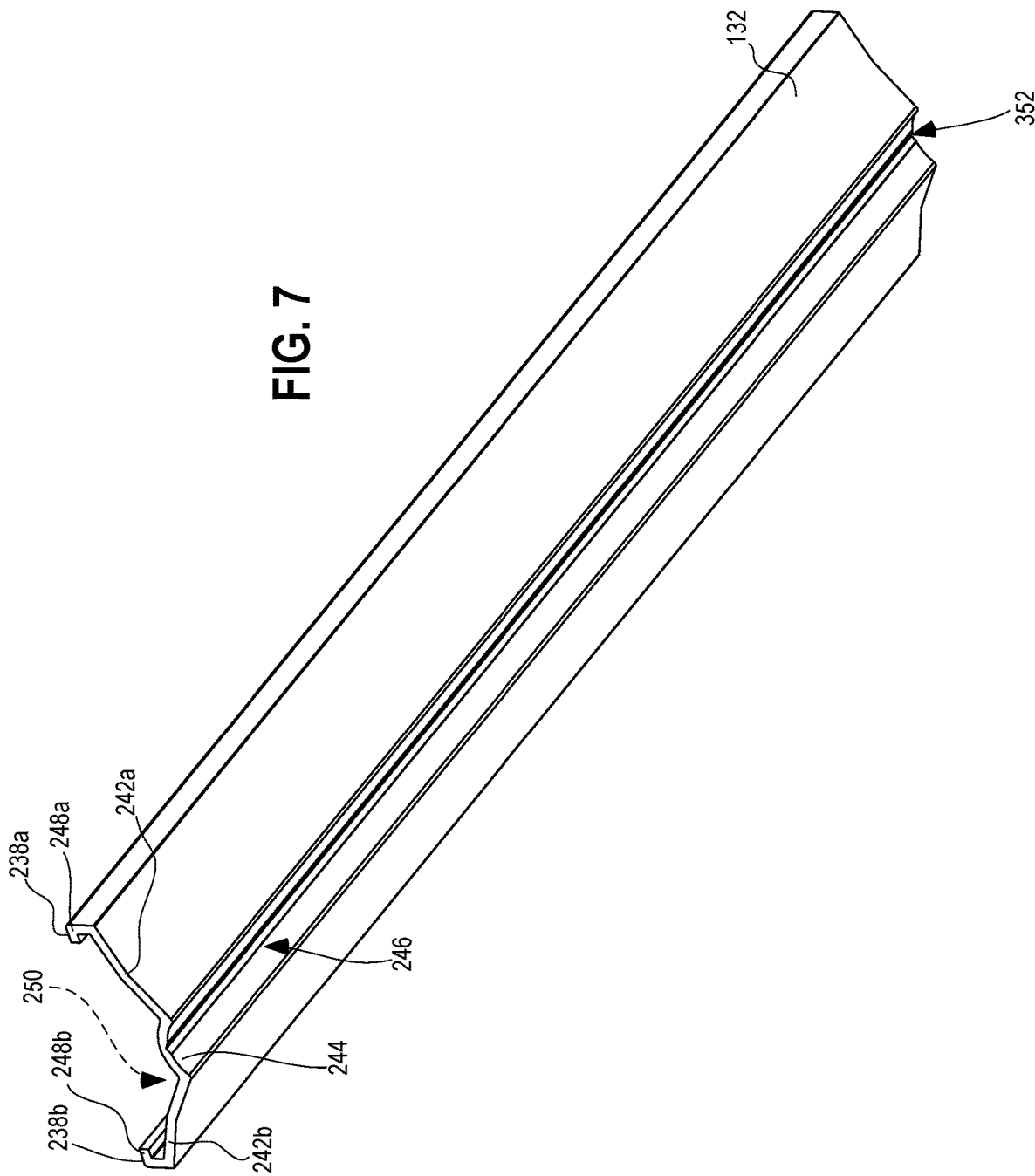

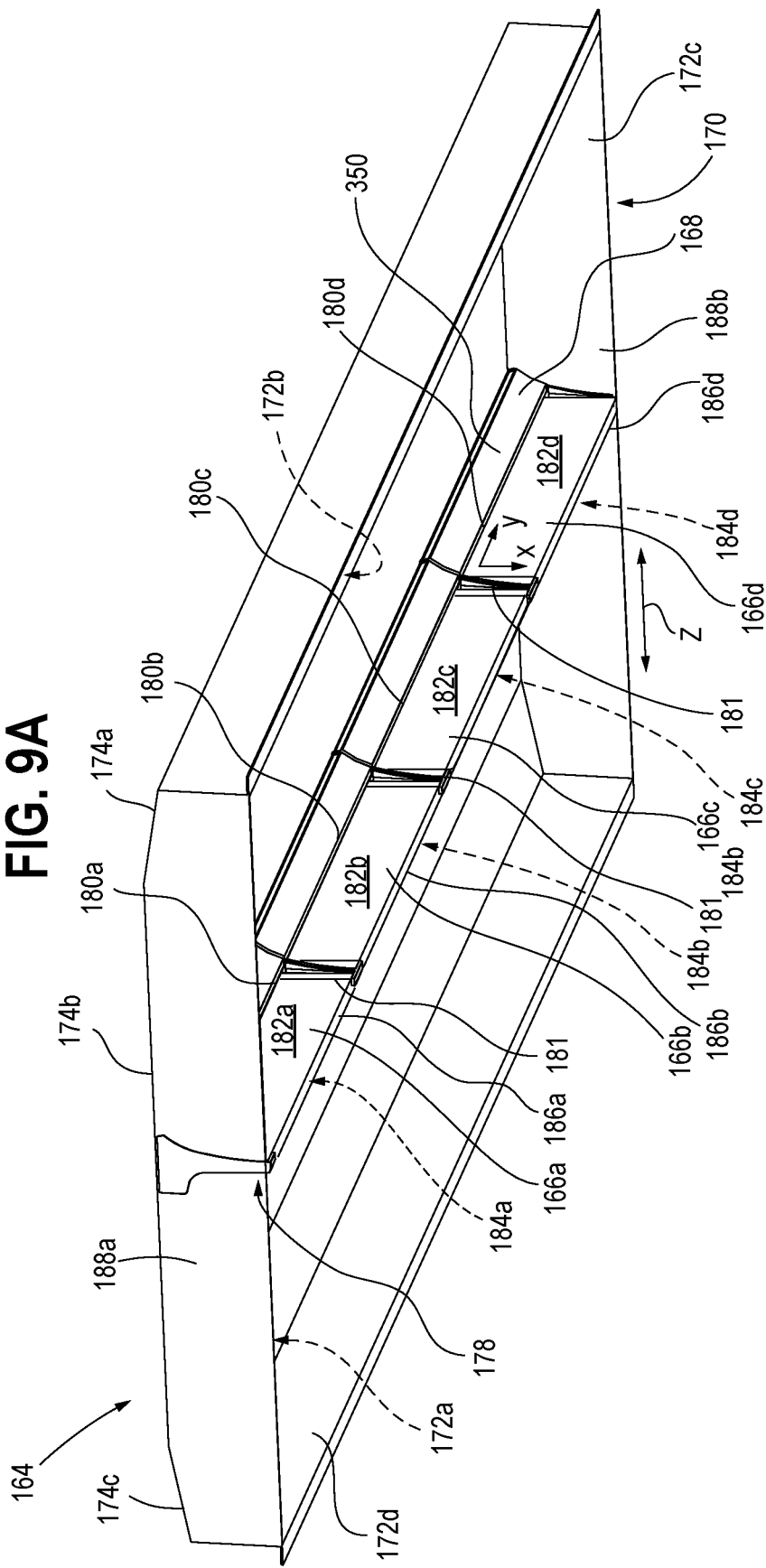

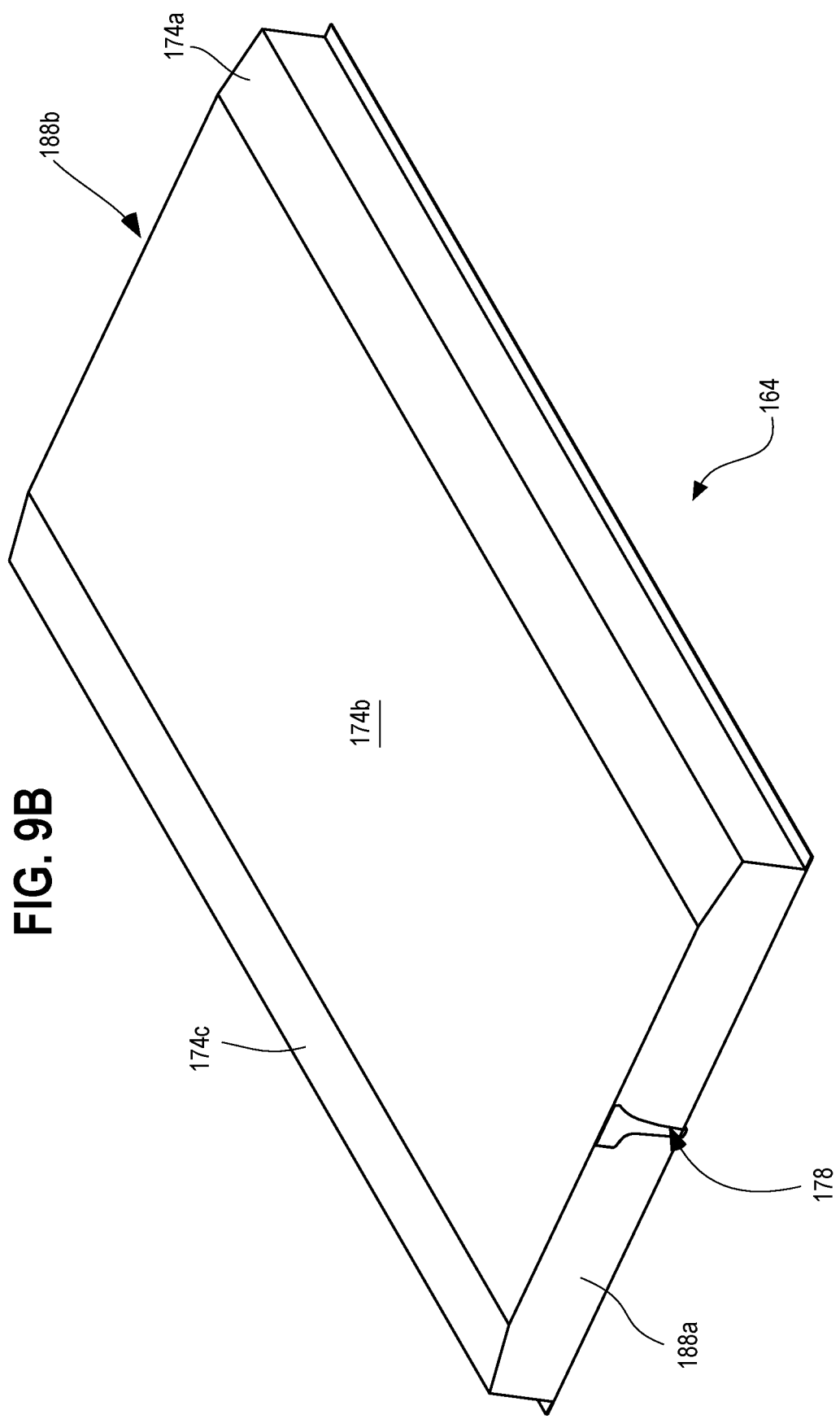

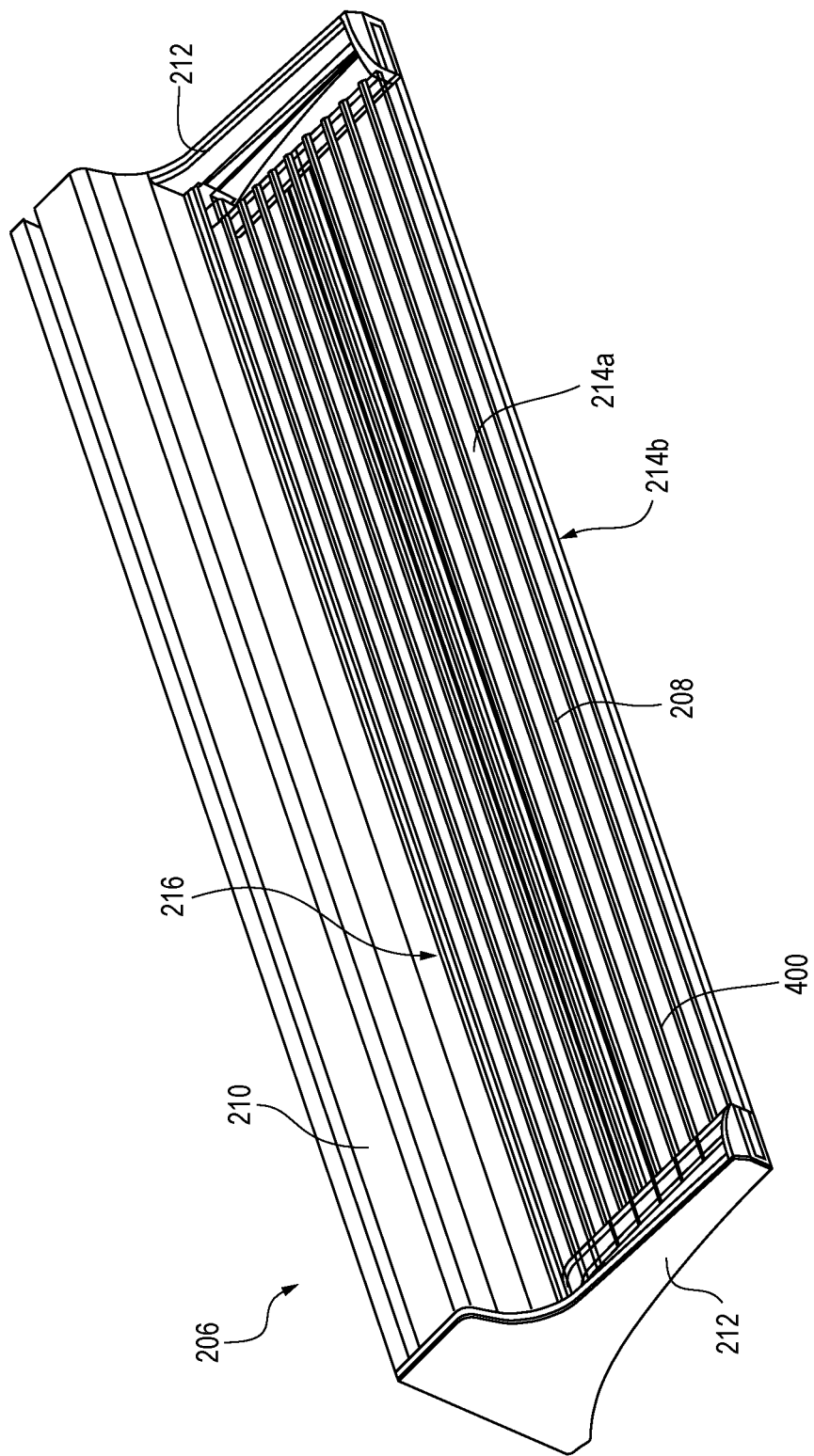

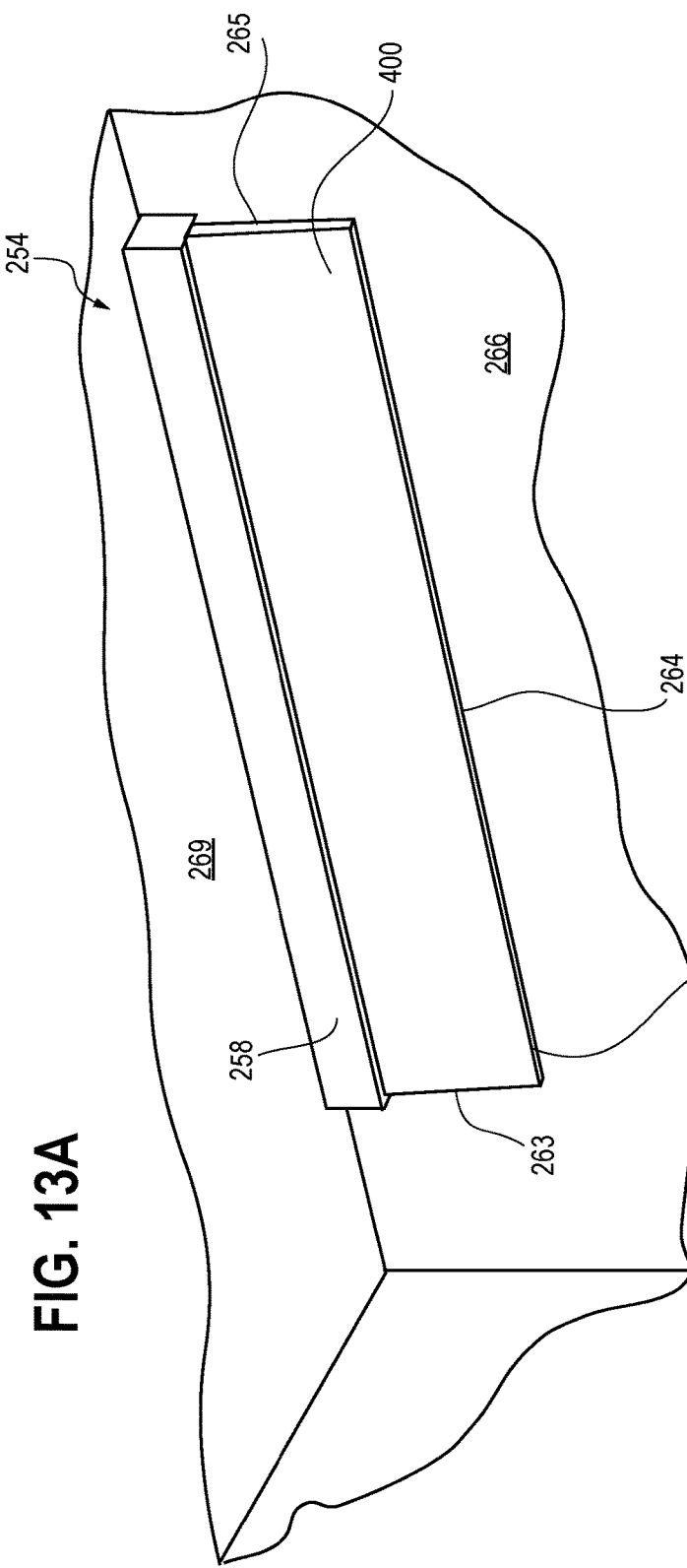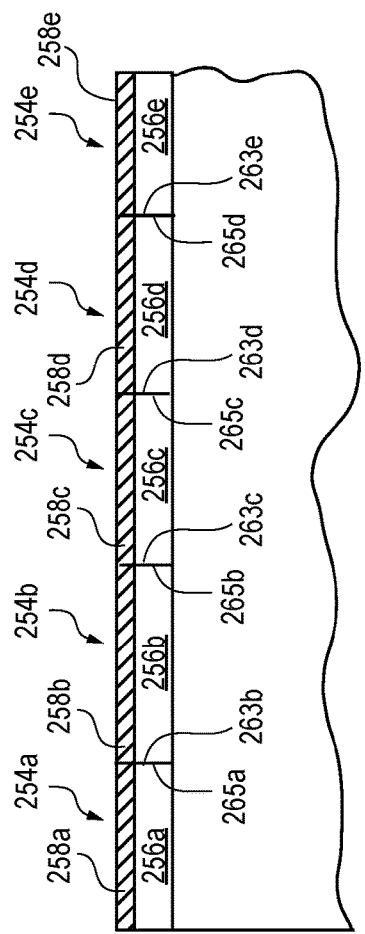

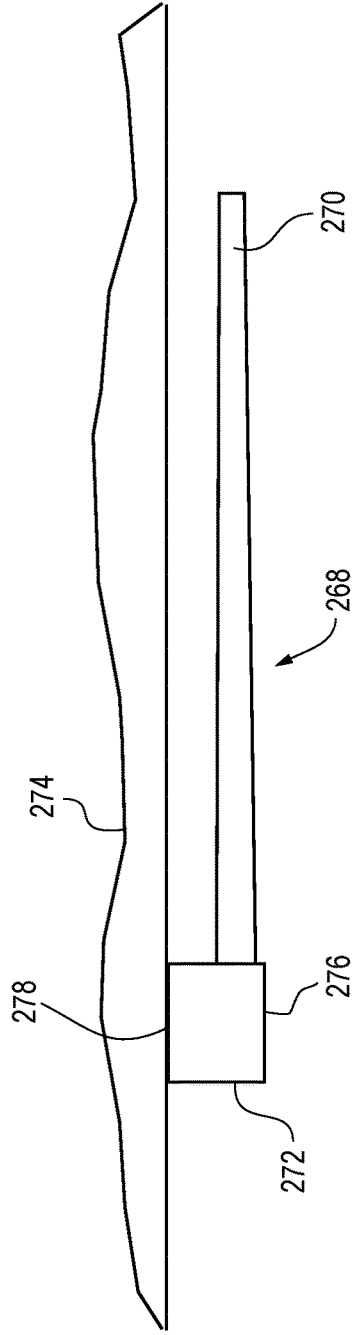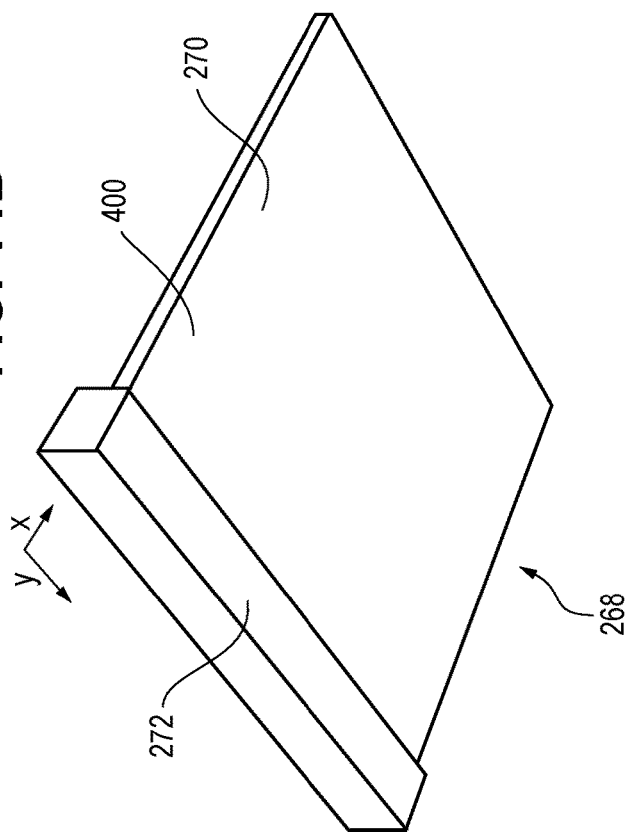

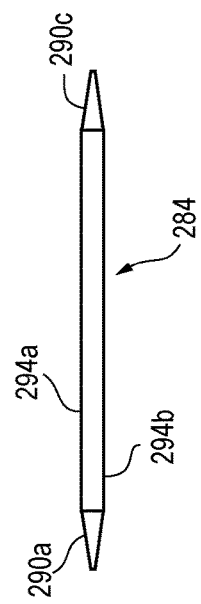
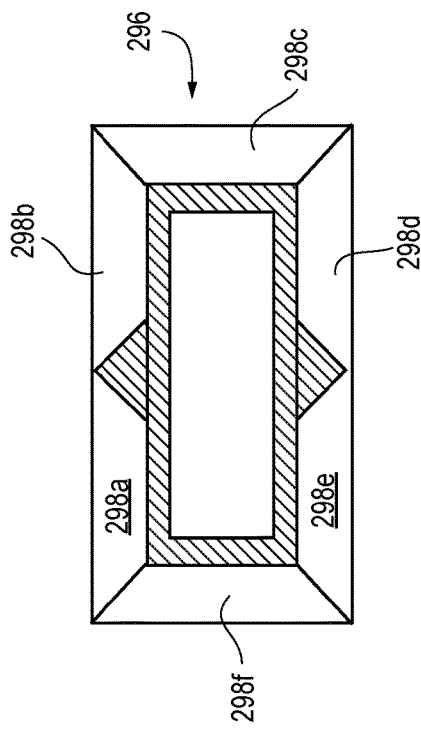
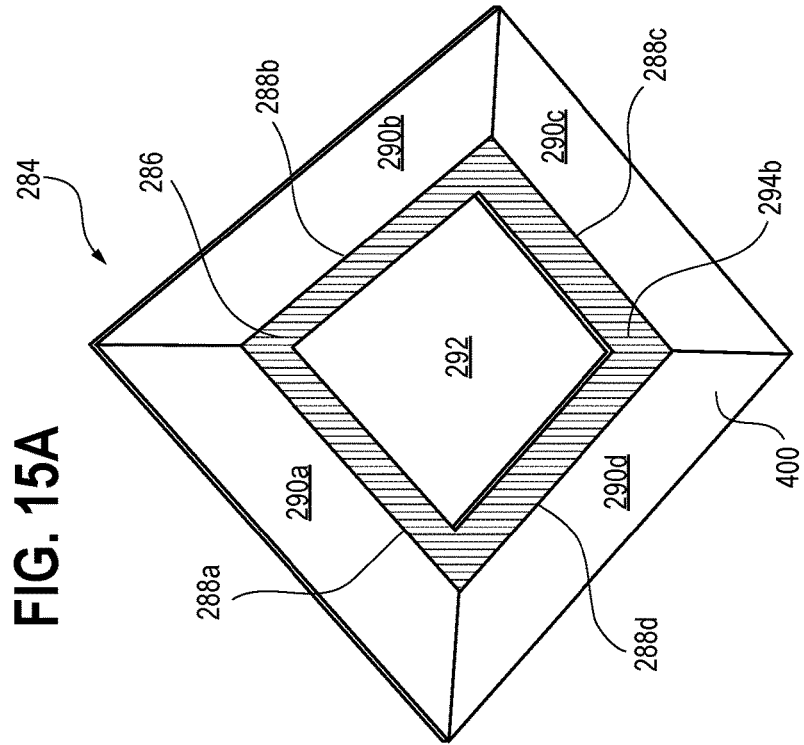

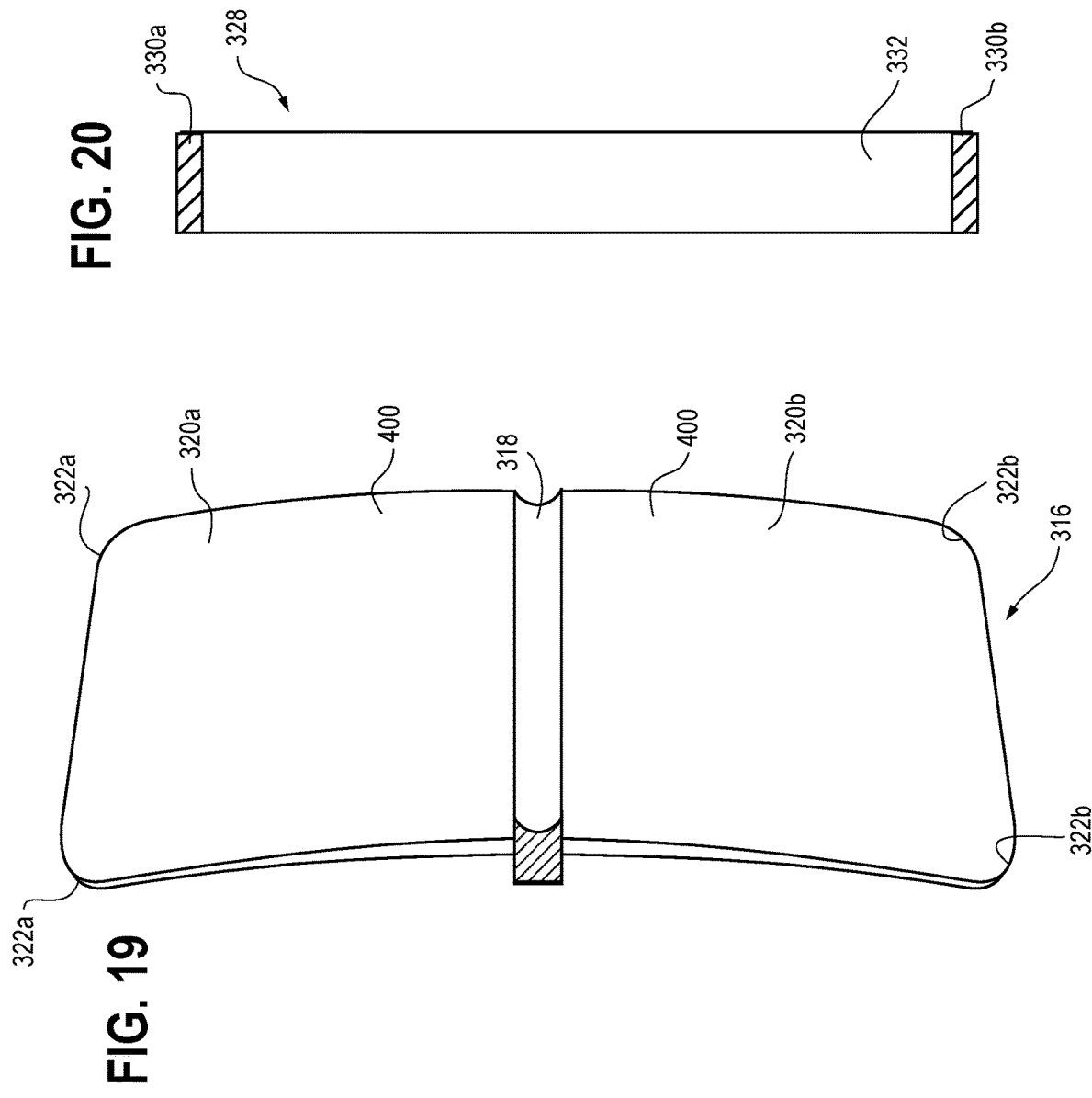

MODULAR WAVEGUIDES AND FIXTURES UTILIZING SAME

CROSS REFERENCE TO RELATED APPLICATIONS

The present application claims the benefit of U.S. Provisional Patent Application No. 62/455,422, filed Feb. 6, 2017, entitled "Modular Waveguide Fixtures", which is owned by the assignee of the present application, and the disclosure thereof is hereby incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to general illumination lighting, and more particularly, to outdoor, indoor, and/or enclosed structure luminaires usable, for example, in home, office, and/or warehouse settings.

BACKGROUND

Large areas of open indoor space, such as an office or warehouse spaces, require sufficient lighting to allow for safe and comfortable activities by persons occupying or visiting the space at all times including periods when natural lighting, such as that provided by windows, is unavailable or reduced during nighttime, rainy or foggy weather conditions, or in the absence of windows. An indoor luminaire for large indoor spaces or smaller indoor spaces, such as hallways or individual office spaces, must illuminate spaces varying in size, floor plan, and intended use. It may be useful for such a luminaire to provide customizable illumination patterns in order to effectively match the light produced by the luminaire with the characteristics of the space to be illuminated. Still further, such a luminaire should be universal in the sense that the luminaire can be mounted in various enclosed and non-enclosed locations, on poles or on a surface (such as a wall or ceiling), and preferably present a uniform appearance, while further being customizable such that desired illumination patterns may be achieved along with the universal quality of such luminaire. Additionally, such a luminaire should be aesthetically pleasing, and further versatile enough to provide illumination patterns suitable for the varied environments mentioned hereinabove.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications.

An optical waveguide mixes and directs light emitted by one or more light sources, such as one or more LEDs. A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 disclose a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors and out of the device from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

The description provided in the background section should not be assumed to be prior art merely because it is mentioned in or associated with the background section. The background section may include information that describes one or more aspects of the subject technology.

SUMMARY

According to an aspect of the present disclosure, a luminaire comprises a housing and at least one waveguide comprising first and second opposite waveguide ends, a coupling portion disposed at the first waveguide end, and a light emitting portion disposed between the first and second waveguide ends. The luminaire is further arranged such that the first waveguide end is disposed adjacent a first luminaire end and the second waveguide end is disposed at a second luminaire end opposite the first luminaire end. Still further, the luminaire comprises at least one LED element disposed within the housing adjacent the coupling portion of the at least one waveguide such that the at least one waveguide provides a first illumination pattern and the at least one waveguide is interchangeable with another waveguide that provides a second illumination pattern.

According to another aspect of the present disclosure, a lighting system comprises at least one luminaire, which comprise a housing and one or more LED elements disposed therein, and a plurality of waveguides, which comprise a coupling portion and a light emitting portion. Further according to this aspect, the plurality of waveguides is coupled to the housings of the at least one luminaire with the coupling portions of each waveguide adjacent the one or more LED elements, and each waveguide is interchangeable with another waveguide of the plurality of waveguides.

According to still another aspect of the present disclosure, a method of producing an illumination pattern comprises providing a luminaire comprising a luminaire housing with one or more optical waveguide coupling positions wherein at least first and second optical waveguide bodies each comprise a shape adapted to be operatively coupled with the one or more optical waveguide coupling positions. This method further comprises disposing the at least first and second optical waveguide bodies at corresponding one or more optical waveguide coupling positions wherein the first optical waveguide body is adapted to develop a first illumination pattern and the second optical waveguide body is adapted to develop a second illumination pattern, and arranging the at least first and second optical waveguide bodies in the one or more optical waveguide coupling positions.

In accordance with yet another aspect of the present disclosure, an optical waveguide system comprises a modular waveguide comprising first and second opposite waveguide ends, a coupling portion disposed at the first waveguide end, and a light emitting portion disposed between the first and second waveguide ends. This system is further arranged such that the coupling portion of the modular waveguide is disposed adjacent at least one LED element disposed within a luminaire, the first waveguide end is disposed adjacent a first luminaire end and the second waveguide end is disposed at a second luminaire end opposite the first luminaire end, and an illumination pattern produced by the luminaire is customized by interchanging the modular waveguide.

Other aspects and advantages will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 5B is an isometric view from above of the suspended fixture shown in FIG. 5A;

FIG. 5D is a sectional exploded view taken generally along the same lines as FIG. 5C;

FIG. 6A is an isometric view from below of a lower portion of the single extrusion housing of the suspended fixture shown in FIG. 5A;

FIG. 6B is an isometric view from above of an upper portion of the single extrusion housing of the suspended fixture shown in FIG. 5A;

FIG. 7 is an isometric view from below of an optical waveguide housing cover piece from the suspended fixture shown in FIG. 5A;

FIG. 9A is an isometric view from below of another embodiment of a troffer-style luminaire that comprises a plurality of optical waveguides in a vertical configuration;

FIG. 9B is an isometric view from above of the troffer-style luminaire shown in FIG. 9A;

FIG. 11B is an isometric view from above of the luminaire shown in FIG. 11A;

FIG. 13A is an isometric view from below of an embodiment of a luminaire that comprises another wall mounted configuration with an optical waveguide in a vertical configuration;

FIG. 13B is a side elevational view of a plurality of the luminaires shown in FIG. 13A depicted in a side-by-side configuration;

FIG. 14A is an end elevational view of a luminaire that comprises a ceiling mounted fixture with an optical waveguide in a horizontal configuration;

FIG. 14B is an isometric view from below of the luminaire shown in FIG. 14A;

FIG. 15A is an isometric view from below of a luminaire that comprises a plurality of optical waveguides arranged in a square configuration;

FIG. 15B is an elevational view of the luminaire shown in FIG. 15A;

FIG. 16 is a bottom elevational view of a luminaire that comprises a plurality of optical waveguides arranged in an elongated configuration;

FIG. 19 is an side isometric view of another embodiment of a luminaire that comprises a plurality of optical waveguides in a wall sconce configuration (I would illustrate the tapering thickness of optical elements);

FIG. 20 is a front elevational view of another embodiment of a luminaire that comprises one or more optical waveguides with two housings in a wall sconce configuration;

FIG. 21 is a front elevational view of another embodiment of a luminaire that comprises a plurality of optical waveguides in a wall fixture configuration;

FIG. 22 is a front elevational view of a luminaire that comprises an optical waveguide in a pathway lighting configuration;

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, components and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

As shown in the FIGS., disclosed herein are embodiments of luminaires and light fixtures for general lighting, task lighting, or the like, more particularly, for illumination of spaces of varying size and floor plan such as a warehouse, office space, hallway, dwelling, or other space. Preferably, the space comprises an indoor space, although the luminaires disclosed herein may be used in other applications, such as an outdoor space or in a covered spaced exposed to the weather.

Figure 1:
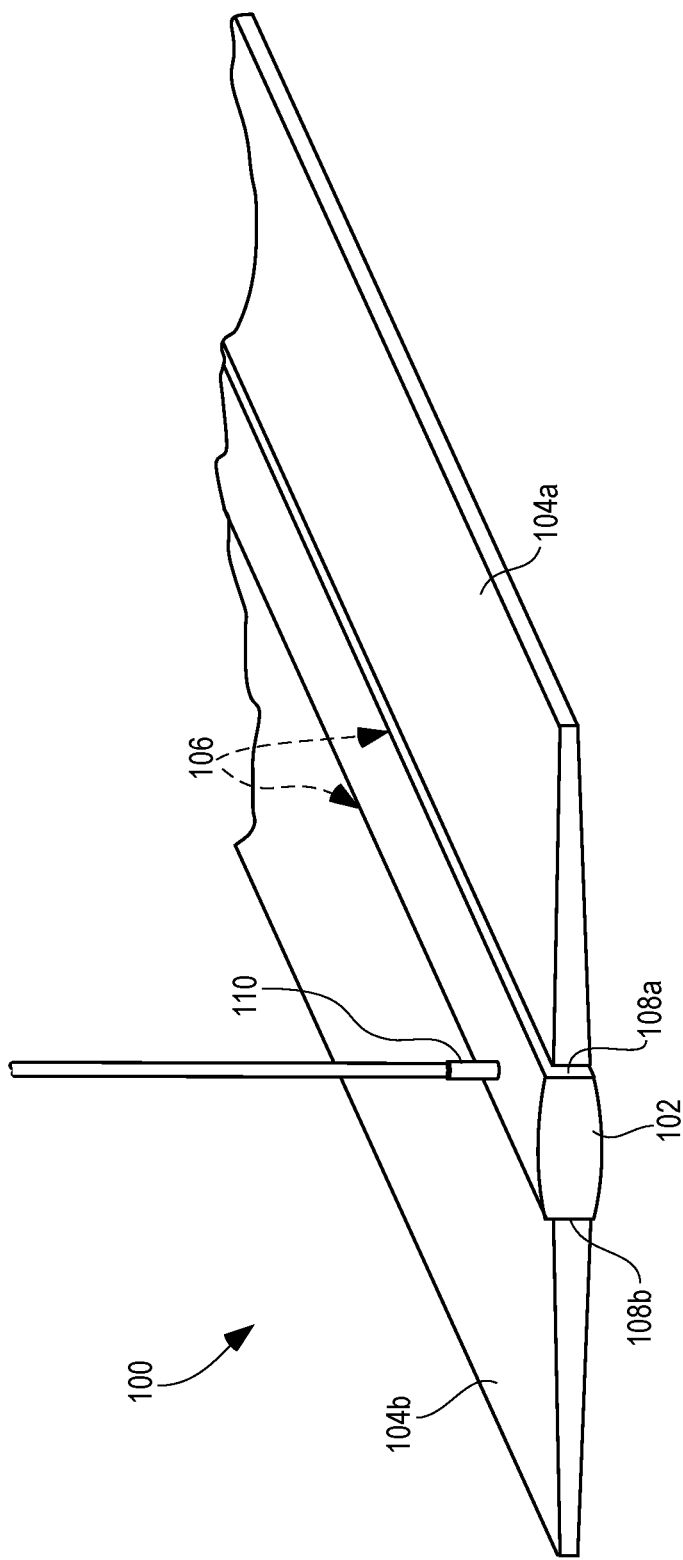
FIG. 1 is a partial isometric view from above of a luminaire comprising a suspended fixture that comprises a plurality of optical waveguides.
Figure 3:
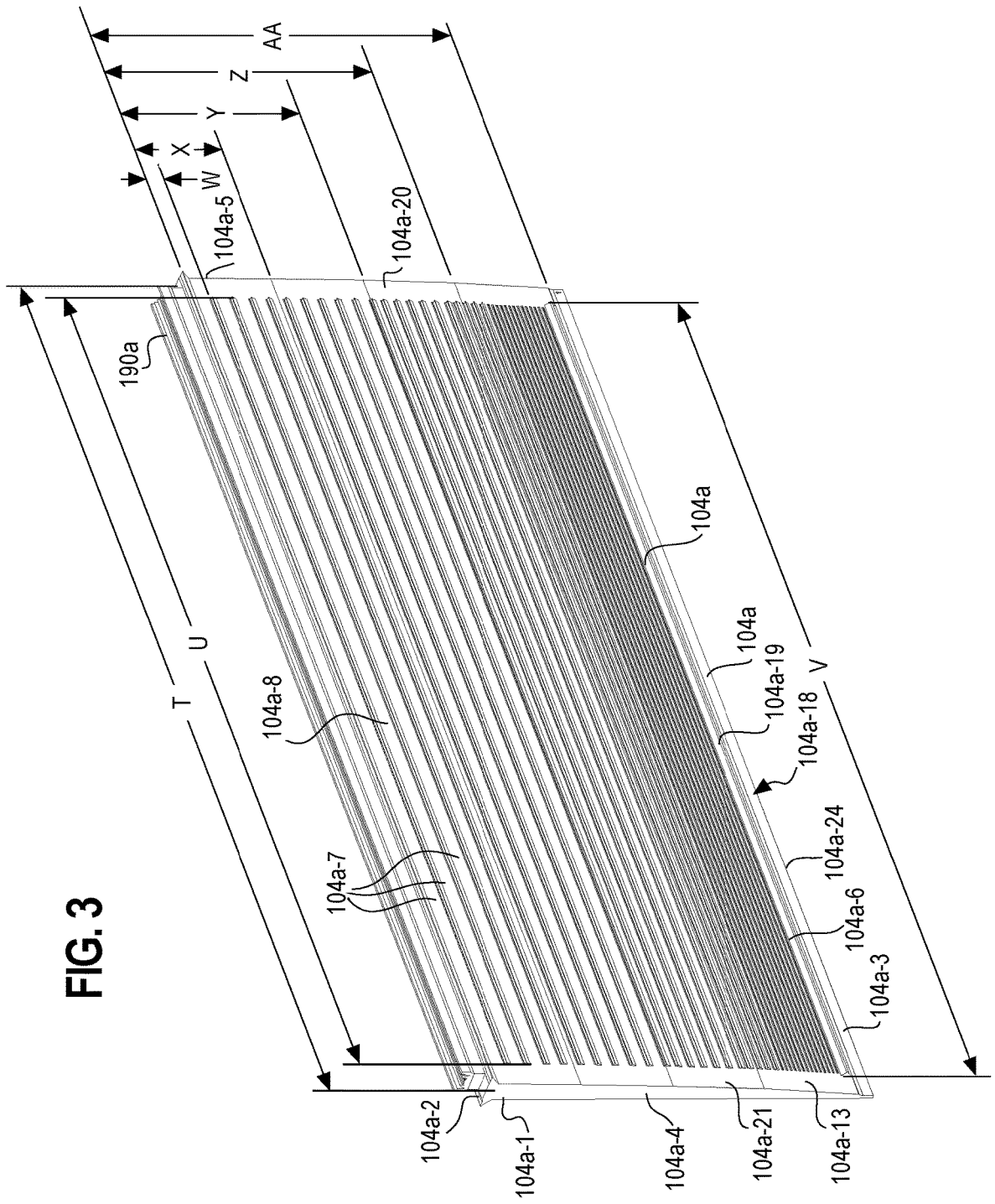
FIG. 3 is an isometric rear view of one of the optical waveguides and coupling members of the luminaire of FIGS. 1, 5A, 5B, 5C, 8, 9A, 10, 11A, 11B, 12A, 12B, 13A, 13B, 14A, 14B, 14C, and 23-27.
Figure 4:
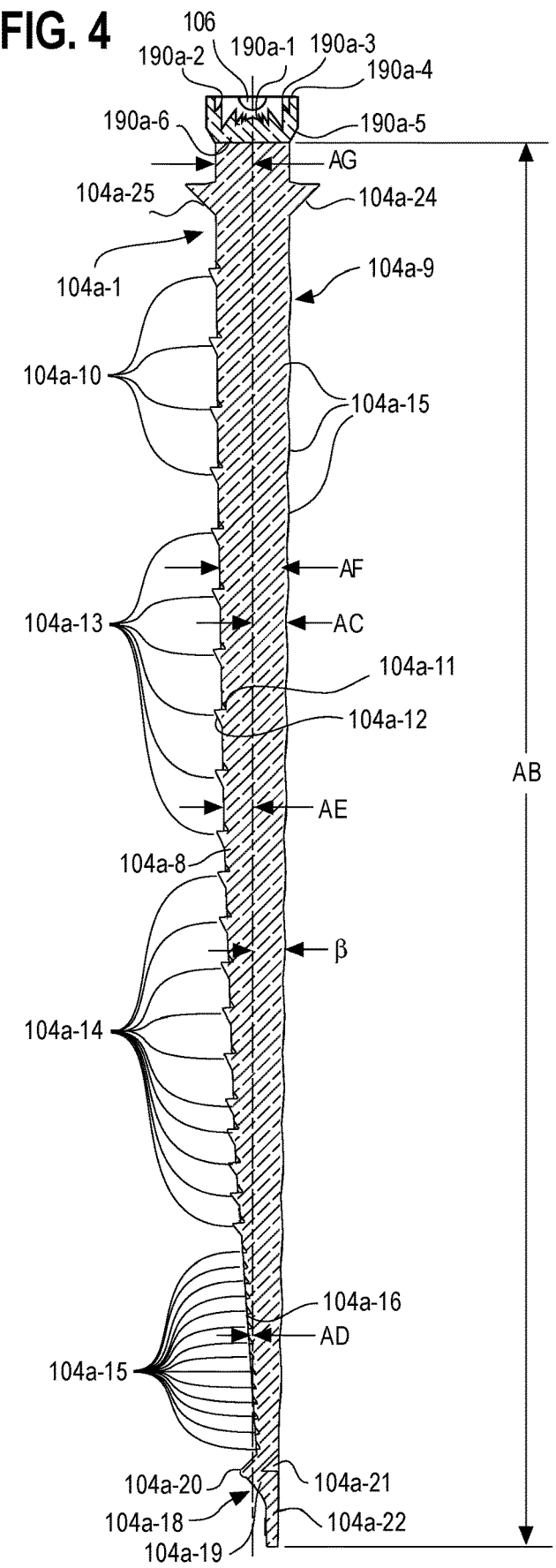
FIG. 4 is a sectional view taken generally along the lines 4-4 of FIG. 2.

A luminaire 100 disclosed in FIG. 1 comprises an elongate housing 102 arranged between a plurality of optical waveguides 104a, 104b such as, for example, the optical waveguide described hereinafter with reference to FIGS. 2-4. The luminaire 100 may be suspended from a ceiling, wall, or post or, alternatively, may be mounted directly on a wall or post. In a further alternative, the luminaire 100 may be mounted or suspended from any other point of suitable structural integrity for supporting the luminaire 100. In the illustrated embodiment a suspension assembly 110 is coupled to the housing 102 for the purpose of suspending the luminaire 110.

The housing 102 may include, among other things, one or more of driver circuitry, light emitting diode(s), control circuitry, sensor(s), power circuitry, circuit board(s), or other components. Furthermore, luminaires described herein may be networked with other luminaires using wired connections or wireless technology and the operation (on/off and/or color and color temperature) may be controlled as desired, for example in coordinated or stand-alone fashion. In the embodiment shown in FIG. 1, one or more LED elements or modules 106 are disposed within the housing 102 adjacent each of the plurality of optical waveguides 104a, 104b such that light emitted by the LEDs is coupled into an edge surface of the optical waveguide along coupling ends 108a, 108b, respectively, thereof, as discussed with reference to FIGS. 2-4. The LED elements and modules 106 discussed herein throughout may be substantially the same or modified in size, shape, color, number, and/or other characteristics to fit housing and illumination specifications of particular luminaire applications/configurations described herein. The housing 102 further provides structural support to the optical waveguides 102a, 102b where said housing 102 meets the coupling ends 108a, 108b.

Each LED element or module 106 (FIGS. 4, 5C, and 5D) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 106 or a plurality of such elements or modules may include one or more blue shifted yellow LEDs and one or more red LEDs. The LEDs 106 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is hereby incorporated by reference herein, may be utilized. In some embodiments, each LED element or module 106 may comprise one or more LEDs disposed within a coupling cavity with an air gap being disposed between the LED element or module 106 and a light input surface. In any of the embodiments disclosed herein each of the LED element(s) or module(s) 106 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source. Still further, any of the LED arrangements and optical elements disclosed in co-pending U.S. patent application Ser. No. 14/101,147, filed Dec. 9, 2013, now U.S. Pat. No. 9,869,432, entitled "Luminaires Using Waveguide Bodies and Optical Elements" by Keller et al., hereby incorporated by reference herein, may be used.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known TIR principles, light rays continue to travel through the waveguide(s) 104 until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

According to one aspect, a waveguide directs light into at least one up to an infinite number of beams or ray groups, wherein the rays of each group travel through the waveguide within a range of angles relative to one another. Each range may be narrow or broad within the TIR limits of the waveguide material.

According to another aspect, a waveguide arranges light into a plurality of groups that bounce at least once inside the waveguide by TIR off one or more surfaces of the waveguide. Each group comprises a plurality of light rays that travel at angles that are disposed within a narrow or broad range of angles relative to one another.

In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Each waveguide 104 (FIGS. 2-4) may have any suitable shape, and the shapes of the waveguides 104 may be different from one another or substantially or fully identical. For example, a first subset fewer than all of the waveguides 104 may be substantially or completely identical to one another, and some or all of the remaining waveguides 104 comprising a second subset may be different than the waveguides of the first subset. In this latter case, the waveguides of the second subset may be substantially or completely identical to each other or some or all may be different from one another. Any combination of substantially or completely identical and/or different waveguides 104 that develop identical or different light illumination distributions is contemplated. Also, although one, two, four, five, and eight waveguides 104 are illustrated in the FIGS., a different number of waveguides could be used, as noted in greater detail hereinafter. In some embodiments, two or more waveguides may be disposed at an angle α (FIGS. 23-27) relative to one another. In one such embodiment, the angle α may be approximately 90 degrees. In another embodiment, the angle α may be greater or less than 90 degrees to produce a desired distribution. In some embodiments, the waveguides may be arranged in a straight line, or may be arranged in a non-linear open or closed path. Still further, the material(s) of the waveguides 104 preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the waveguides 104 are all solid or some or all have one or more voids or discrete bodies of differing materials therein. The waveguides 104 may be fabricated using procedures such as hot embossing or molding, including injection/compression molding. Other manufacturing methods may be used as desired.

Figure 2:
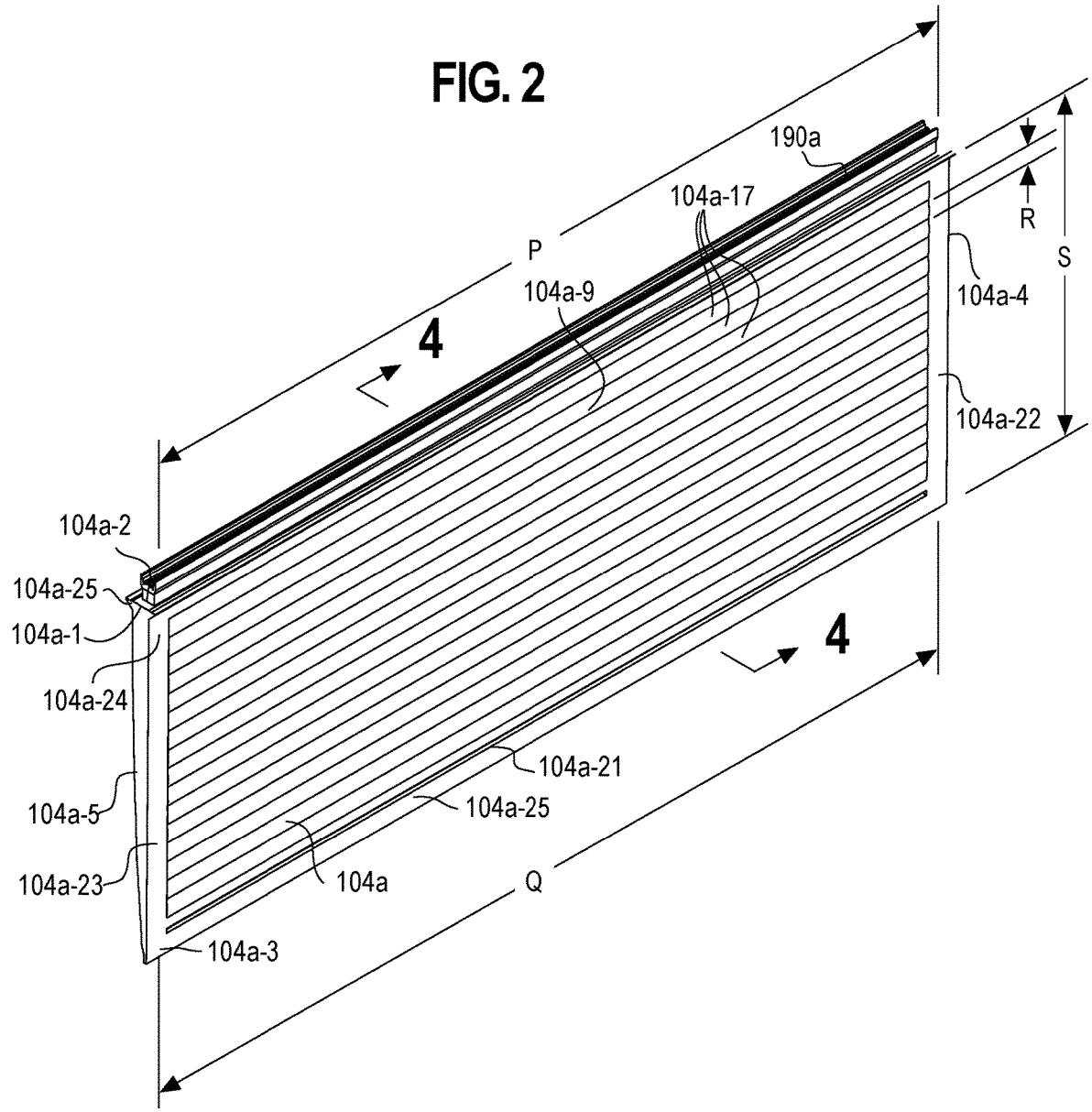
FIG. 2 is an isometric front view of one of the optical waveguides and coupling members of the luminaire of FIGS. 1, 5A, 5B, 5C, 8, 9A, 10, 11A, 11B, 12A, 12B, 13A, 13B, 14A, 14B, 14C, and 23-27.

As seen in FIG. 2, the waveguide 104a includes an enlarged tapered portion 104a-1 adjacent a first or top end 104a-2. The waveguide 104a further includes a second or bottom end 104a-3 and side edge portions 104a-4 and 104a-5. Referring to FIG. 4, a light emitting portion 104a-6 is disposed between the portion 104a-1 and end 104a-3. The light emitting portion 104a-6 includes a plurality of light extraction features 104a-7 disposed on or in a first or rear surface 104a-8 opposite a second or front surface 104a-9. It should be noted that the light extraction features 104a-7 may be irregularly spaced or some may be regularly spaced and others irregularly spaced, etc. In the illustrated embodiment, the plurality of light extraction features 104a-7 includes a first set of features 104a-10 (FIG. 4) that are relatively large and widely spaced and disposed at an upper portion of the waveguide 104a relatively nearer the tapered portion 104a-1. Each of the extraction features 104a-10 may be generally of the shape disclosed in International Application Serial No. PCT/US14/13937, filed Jan. 30, 2014, entitled "Optical Waveguide Bodies and Luminaires Utilizing Same", owned by the assignee of the present application and the disclosure of which is hereby incorporated by reference herein. As seen in FIG. 4, each feature 104a-10 comprises an elongate wedge-shaped channel or groove 104a-11 disposed adjacent an elongate wedge-shaped ridge or protrusion 104a-12, both of which preferably extend partially between the side edge portions 104a-4 and 104a-5 transversely (preferably, although not necessarily, perpendicularly) with respect thereto. The wedge-shaped channel 104a-11 includes an extraction surface 104a-11a formed at an angle relative to the rear surface 104a-8. The angle may be constant, vary throughout the length of the extraction feature 104a-10, vary throughout the group of extraction features 104a-10, and/or vary throughout the groups of extraction features 104a-10, 104a-13, 104a-14, and/or 104a-15 described below. In some embodiments, the angle varies between about 25° and about 40°. Also preferably, although not necessarily, the channels and ridges of each feature 104a-10 are parallel to each other and to other channels and ridges of other features 104a-10.

The remaining waveguides 104b, 116a-116h, 132, 142, 166a-166d, 194a-194h, 208, 220a-220d, 256, 270, 282, 288a-288d, 298a-298f, 308a, 308b, 314a-314d, 320a, 320b, 326a, 326b, 332 described herein throughout may include corresponding elements/extraction features 400 that are substantially similar or identical to the elements 104a-1 through 104a-25. In at least the illustrated embodiment of FIG. 1, the waveguides 104a-104b are all disposed at the same, or substantially the same, elevation in the luminaire 100, although this need not be the case.

Referring now to FIGS. 5A-5D, an embodiment of a luminaire 112 with an elongate housing 114 is depicted. Similar to the luminaire 100 discussed with reference to FIG. 1, the luminaire 112 shown in FIGS. 5A and 5B comprises a plurality of optical waveguides 116a-116h disposed along left (L) and right (R) sides (FIG. 5A) of the housing 114 and supported by a combination of said elongate housing 114, gussets 118a-118j, and structural brackets 120a-120j. The elongate housing 114 provides structural support to the optical waveguides 116a-116h where said housing 114 meets coupling ends 122a-122h of each optical waveguide 116a-116h.

The elongate housing 114 may include, among other things, one or more of driver circuitry, light emitting diode(s), control circuitry, sensor(s), power circuitry, circuit board(s), or other components. These components are disposed between upper and lower housing portions 138, 135. The luminaire 112 comprises one or more LED elements or modules 106, as discussed hereinabove, disposed on the one or more PCBs 240 and arranged to direct light into the coupling ends 122a-122h of the optical waveguides 116a-116h. Each optical waveguide 116a-116h is supported along sides thereof in the embodiment shown in FIGS. 5A-5C, and each optical waveguide 116a-116h is substantially identical to each other waveguide.

Further, each of optical waveguides 116a-116h is supported by components of the luminaire 112 and coupled to LED elements or modules 106 in substantially identical fashion, save relative location. Also, such optical waveguides 116a-116h are preferably identical to one another (except possibly the size, placement, and/or arrangement of optical features, such as extraction features), and therefore interchangeable and/or modular. For example, one or more replacement optical waveguides (not shown) may be inserted into the luminaire 112 upon removal of one or more of the optical waveguides 116a-116h shown in the example luminaire 112 of FIGS. 5A-5D.

Because the optical waveguides 116a-116h are substantially identical to one another (with the possible exception of one or more optical elements as noted above) only the optical waveguide 116a will be described in detail herein. Referring once again to the waveguide embodiment shown in FIGS. 2-4, an optical coupling member 190a is disposed at an end of the waveguide 104a. The material of the optical coupling member 190a is preferably somewhat sticky so that a planar bottom surface 190a-6 of the member 190a adheres to and forms an optically transmissive bond with a planar top end 104a-2 of the waveguide 104a. In another embodiment, the optical coupling member 190a may comprise an acrylic material such as poly(methyl methacrylate) (PMMA) that is overmolded onto or otherwise optically coupled to the acrylic waveguide 104a during fabrication. In a further embodiment, the optical coupling member 190a and the waveguide 104a may be fabricated as a unitary piece of a single material using procedures such as hot embossing or molding, including injection/compression molding, or other suitable methods. Further, a tapered outer surface 190a-5 preferably, but not necessarily, contacts a rigid electrically conductive member comprising a printed circuit board (PCB) 240, and/or a flexible circuit element (not shown) carrying the LED element or module 106 when the optical coupling member 190a is fully inserted into a coupling position (FIGS. 5C and 5D).

In the illustrated embodiment, at least one, and more preferably more than one, LED elements or modules 106 are mounted on the PCB(s) 240 or a flexible circuit element, and the LED elements or modules 106 emit light toward the optical conducting members 190. The flexible circuit element and/or PCB(s) 240 may include one or more layers of aluminum and/or copper.

If desired, the flexible circuit conductor and/or PCB(s) 240 may include a surface (not shown) adjacent the LED elements or modules 106 that has a white or specular reflective coating or other member secured or otherwise applied thereto.

Still further, any of the mechanical structures, LED arrangements, circuits, and optical elements disclosed in co-pending U.S. patent application Ser. No. 14/671,512, filed Mar. 27, 2015, now U.S. Pat. No. 9,581,750, entitled "Outdoor and/or Enclosed Structure LED Luminaire" by Wilcox et al., co-pending U.S. patent application Ser. No. 14/583,415, filed Dec. 26, 2014, now U.S. Pat. No. 10,502,899, entitled "Outdoor and/or Enclosed Structure LED Luminaire" by Wilcox et al., and/or co-pending U.S. patent application Ser. No. 14/462,426, filed Aug. 18, 2014, now U.S. Pat. No. 10,379,278, entitled "Outdoor and/or Enclosed Structure LED Luminaire for General Illumination Application, Such as Parking Lots and Structures" by Wilcox et al., all of which are hereby incorporated by reference herein, may be used. Additionally, any of the mechanical structures, LED arrangements, circuits, and optical elements disclosed in International Application No. PCT/US2014/30017, filed Mar. 15, 2014, entitled "Optical Waveguide Body", U.S. patent application Ser. No. 14/485,609, filed Sep. 12, 2014, now U.S. Pat. No. 9,952,372, entitled "Luminaire Utilizing Waveguide", U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", U.S. Provisional Patent Application No. 62/025,905, filed Jul. 17, 2014, entitled "Luminaire Utilizing Waveguide", U.S. patent application Ser. No. 14/657,988, filed Mar. 13, 2015, now U.S. Pat. No. 9,709,725, entitled "Luminaire Utilizing Waveguide", U.S. patent application Ser. No. 15/060,354, filed Mar. 3, 2016, now U.S. Pat. No. 9,835,317, entitled "Luminaire Utilizing Waveguide", U.S. patent application Ser. No. 15/060,306, filed Mar. 3, 2016, now U.S. Pat. No. 9,841,154, entitled "Luminaire Utilizing Light Emitting Diodes", U.S. Provisional Patent Application No. 62/301,559, filed Feb. 29, 2016, entitled "Luminaire Utilizing Waveguide", U.S. Provisional Patent Application No. 62/301,572, filed Feb. 29, 2016, entitled "Luminaire Utilizing Light Emitting Diodes", U.S. Pat. No. 9,366,799, issued Jun. 14, 2016, entitled "Optical Waveguide Bodies and Luminaires Utilizing Same", and U.S. patent application Ser. No. 15/277,670, filed Sep. 27, 2016, now U.S. Pat. No. 10,422,939, entitled "Waveguide Having Unidirectional Illuminance" all owned by the assignee of the present application and the disclosures of which are hereby incorporated by reference herein.

Referring again to FIGS. 5A-5D, optical waveguide 116a is supported by the elongated housing 114 along the coupling end 122a thereof, as noted above, as well as the structural brackets 120a, 120b. The structural brackets 120a, 120b support first and second edges 124a, 124b of the optical waveguide 116a, while an exterior edge 126 thereof is left open and uncovered by structural supports and/or housings. The gussets 118a, 118b support the associated structural arms 120a, 120b, which, in turn, support the respective waveguide edges 124a, 124b. The exterior edge 126 may emit a portion of light coupled into the waveguide 116a such that the uncovered, exterior edge 126 provides outward illumination or a glowing effect.

Optical waveguide 116a may have features disposed thereon for extracting light, as discussed with respect to FIGS. 2-4 hereinabove, such that, for example, an illumination pattern wherein about eighty percent of light is emitted downwards from a lower surface 128 thereof, and about twenty percent of light is emitted upwards from an upper surface 130. Alternatively, the ratio of light emitted out of the lower and upper surfaces 128, 130, respectively, may be customized for each optical waveguide 116a-116h in order to produce an overall illumination pattern for the luminaire 112 that is desirable for a particular application or setting.

In a further alternative, the optical waveguide 116a may have an arrangement of features disposed on the lower and upper surfaces 128, 130 thereof, such that, for example, the downward emitted light is distributed according to a directional pattern. Specifically, the downward light emitted from the lower surface 128 of the optical waveguide 116a may be directed straight down, outward, and away from the luminaire 112 and elongated housing 114, or concentrated downward such was for a task lighting or workstation lighting illumination pattern. Again, the directional component of light emitted from the optical waveguide 116a may be customized for each optical waveguide 116a-116h in order to produce an overall illumination pattern for the luminaire 112 that is desired for a particular application or setting.

Moreover, one or more of the optical waveguides 116a-116h may develop an illumination distribution having a directional lighting component while one or more other of the optical waveguides 116a-116h may develop an illumination distribution having a different directional component or no directional component. By way of further example, waveguides 116*a*, 116*d*, 116*e*, 116*h* disposed on the ends of the luminaire 112 may develop directional components for lighting workstations under either end of said example luminaire 112. In still another example, the luminaire 112 may be disposed hanging from a ceiling (not shown) with a left side of the luminaire 112 proximal a vertical wall. In this example, the waveguides 116*e*-116*h* disposed along the left side (as seen in FIG. 5A) of the luminaire may have a generally downward illumination pattern while the waveguides 116*a*-116*d* disposed along the right side (not shown) of the luminaire may direct light away from the elongated housing 114, thereby directing light away from the vertical wall, and providing greater illumination to a room or indoor space associated with the wall and ceiling.

Given that each optical waveguide 116*a*-116*h* of the luminaire 112 may produce any customizable illumination pattern and that each optical waveguide 116*a*-116*h* is modular, such waveguides 116*a*-116*h* may be easily interchanged and selected to produce customizable overall illumination patterns for the luminaire 112, according to parameters suitable for a given indoor lighting application or simply according to desired characteristics.

Figure 5A:
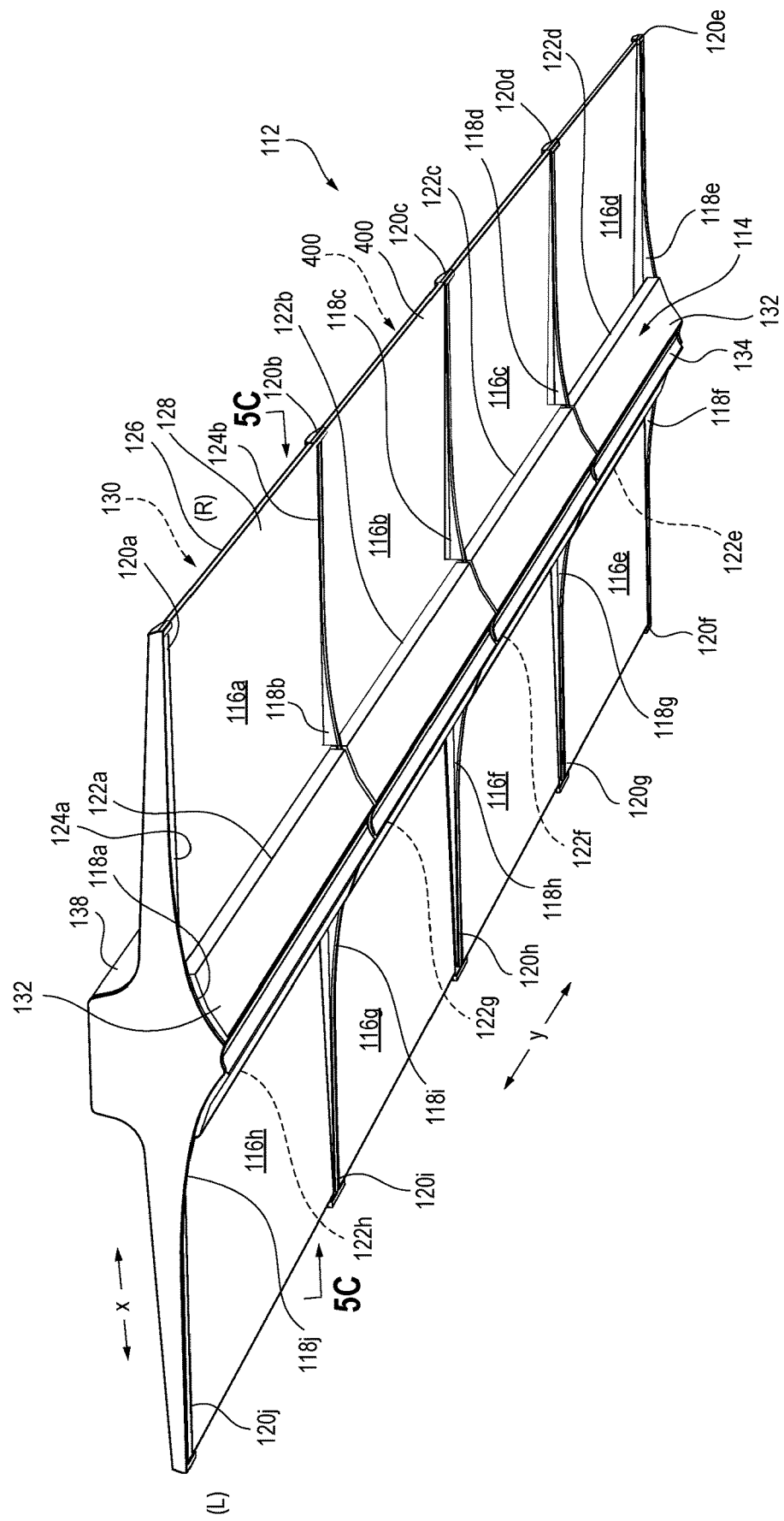
FIG. 5A is an isometric view from below of another embodiment of a suspended fixture that comprises a plurality of optical waveguides.
Figure 5C:
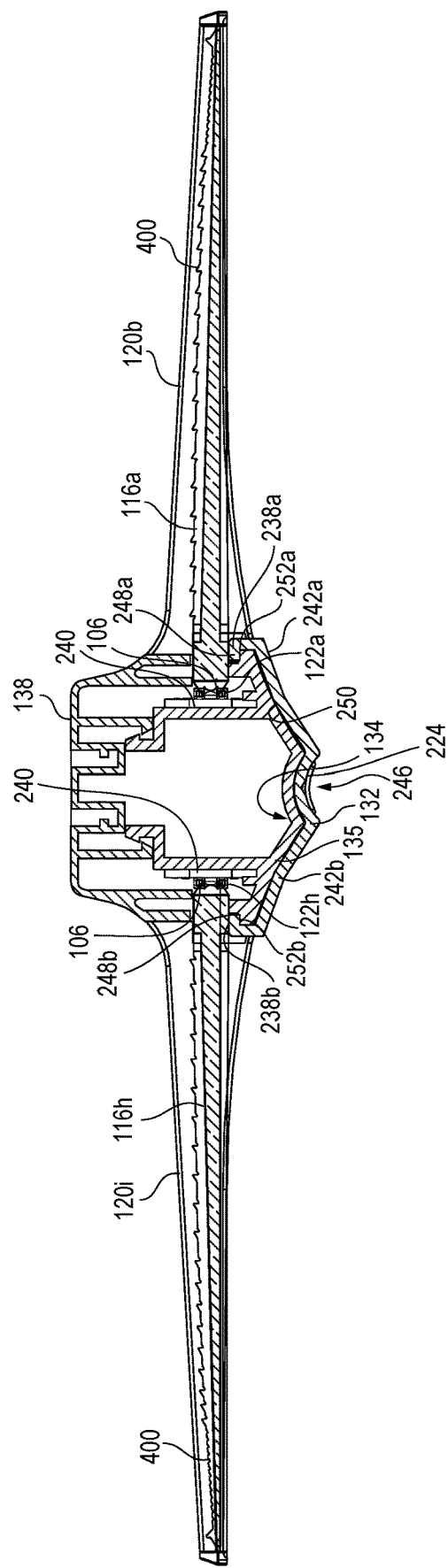
FIG. 5C is sectional view taken generally along the lines 5C-5C of FIG. 5A.

With further reference to FIGS. 5A-6B, the elongate housing 114 may be formed from plastic, glass, metal, or some combination thereof. For example, the housing 114 may be fabricated from a single extrusion of one or more polymers to form the entire length thereof. As seen in FIG. 5A, the luminaire 112 may be in the range of about two feet in the y-dimension by about sixteen inches in the x-dimension. Further, each optical waveguide may be about one foot in the y-dimension and about six inches in the x-dimension. However, dimensions of the optical waveguides 116*a*-116*h* may be subject to modification, and further, may be customized to fit different suspended luminaire configurations, or the other luminaire configurations discussed hereinbelow.

The single extrusion elongate housing 114 may be painted any desired color or coated with a variety of reflective materials. In the example embodiment shown in FIGS. 5A, 5C, and 5D, the housing 114 has disposed along an underside thereof an elongate optical waveguide 132 (FIG. 7). The elongate optical waveguide 132 may be in optical communication with either one or more LED elements or modules 106 or with the optical waveguides 116*a*-116*h*.

Referring now to FIGS. 5C, 5D, and 7, light is directed out of the bottom surface 128 of each optical waveguide 116*a*-116*h* into coupling surfaces 238*a*, 238*b* of the elongate optical waveguide 132. Light coupled into the coupling surfaces 238*a*, 238*b* travels through first and second arcuate arms 242*a*, 242*b* of the elongate optical waveguide 132 until reaching an emission surface 244. The emission surface 244 is aligned with an indentation 134 on the lower portion 135 of the elongate housing 114. Light is directed out of the optical waveguide 132 through the emission surface 244 such that a small amount of emitted light develops a glowing appearance along the underside of the luminaire 112. The glowing appearance of the elongate optical waveguide 132 may improve the appearance of the luminaire 112 by lessening the contrast between the light emitting optical waveguides 116*a*-116*h* and the elongate housing 114, which typically would not emit light. The emission surface 244 may have disposed thereon one or more extraction feature(s) 246 or texturing to direct light out of the elongate optical waveguide 132.

The elongate optical waveguide 132 snaps into place over the indentation 134 and the lower portion 135 of the elongate housing 114 such that an interior surface 250 of elongate waveguide 132 enfolds the contour of said lower portion 135 of the housing 114. Such contour of the housing 114 defines the curve of the first and second arcuate arms 242*a*, 242*b*. In addition to contacting associated optical waveguides 116*a*-116*h*, the first and second coupling surfaces 238*a*, 238*b* form one side of respective first and second flanges 248*a*, 248*b* disposed at ends of either associated arcuate arm 242*a*, 242*b*. The flanges 248*a*, 248*b* engage with surfaces 252*a*, 252*b* of the lower portion 135 of the elongate housing 114 such that the elongate optical waveguide 132 is secured thereto. The elongate optical waveguide 132 partially surrounds a portion of the housing 114 such that the housing is covered thereby on one or more side(s); in this example the lower portion 135 of the housing 114 is covered by the elongate optical waveguide 132. Referring ahead to FIGS. 9A and 10-12A, an elongate optical waveguide 350 may cover a portion of respective housings of luminaires in said FIGS. In embodiments disclosed herein, the elongate optical waveguide 350 comprises one side of the elongate optical waveguide 132, including for example, the first arcuate arms 242*a*, first coupling surface 238*a*, and first flange 248*a*. In such an embodiment, the structure of the elongate optical waveguide 350 (FIG. 12A) corresponds to one half of the elongate optical waveguide 132 if such waveguide 132 were to be sectioned along a center line 352 (FIGS. 5D and 7) disposed on the emission surface 244 thereof.

The luminaire 112 may have one or more mounting or suspension assemblies 136 disposed on an upper housing portion 138 thereof (FIG. 5B). The mounting or suspension assemblies 136 may mechanically connect the luminaire 112 to a ceiling, pole, post, joist, or any other structurally suitable overhead mounting element(s). Alternatively, the mounting or suspension assemblies 136 may connect the luminaire to one or more wall(s), pole(s), post(s), stud(s), or any other structurally suitable horizontal mounting element(s). Electrical connections may be made in any manner to the luminaire.

Figure 8:
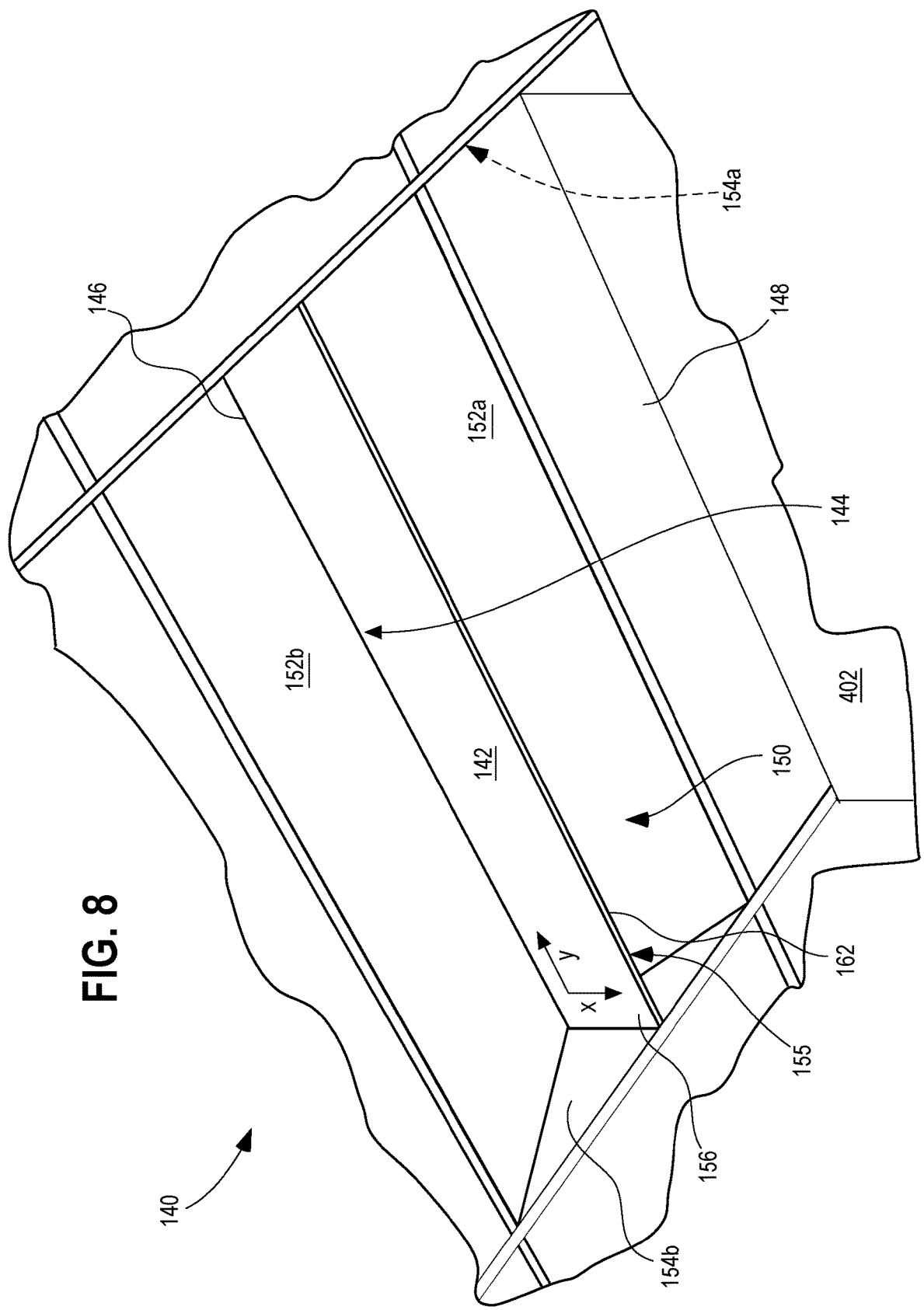
FIG. 8 is a perspective view from below of a troffer-style luminaire that comprises an optical waveguide in a vertical configuration.
Figure 10:
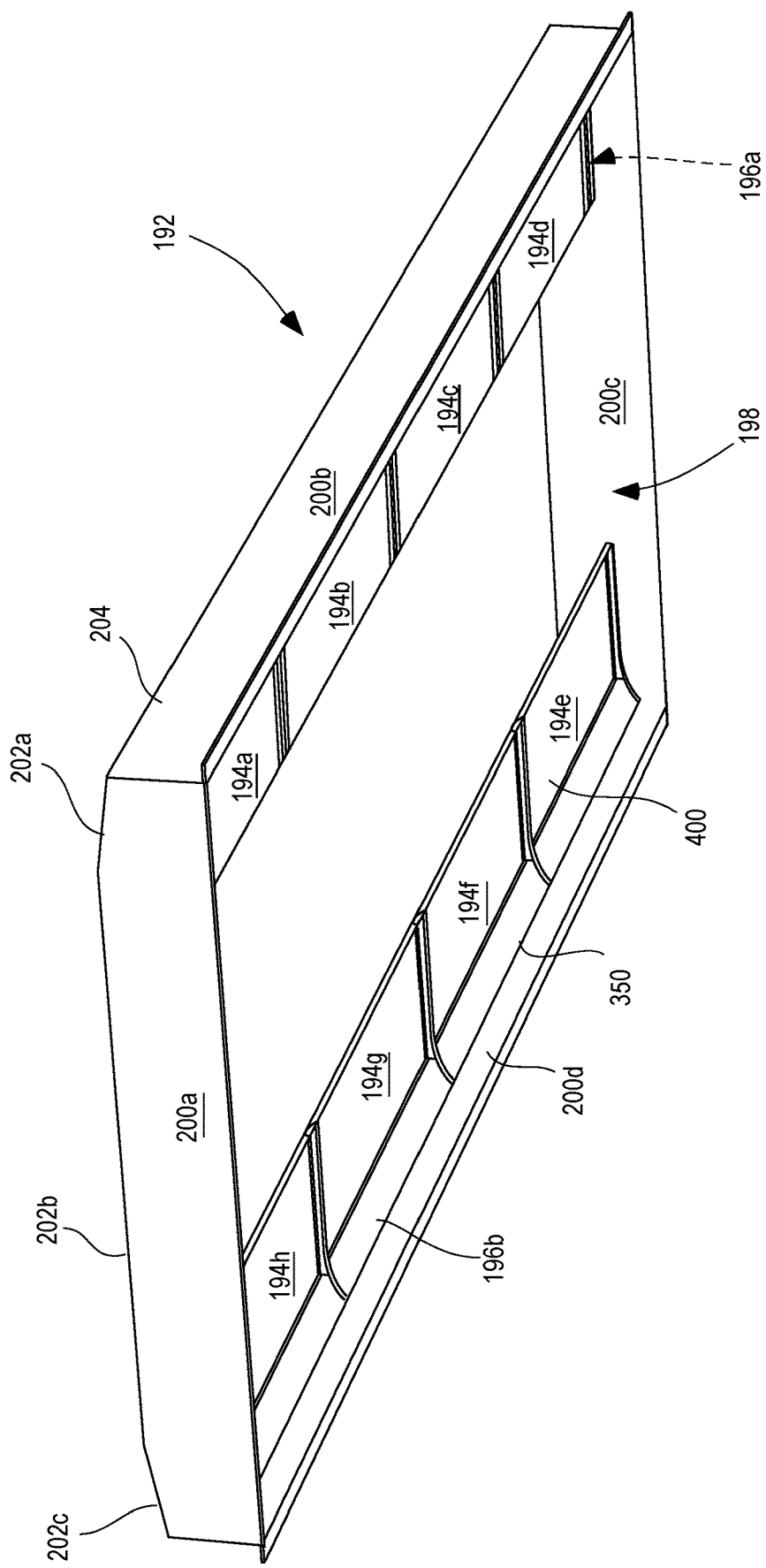
FIG. 10 is an isometric view from below of another embodiment of a troffer-style luminaire that comprises a plurality of optical waveguides in a horizontal configuration.

Referring now to FIG. 8, an embodiment of a troffer-style luminaire 140 is depicted with an optical waveguide 142 arranged in a vertical position. A coupling end 144 of the optical waveguide 142 is disposed proximal a center line 146 of a troffer 148. The troffer 148, or troffers depicted in FIGS. 9A-10 and described hereinbelow, may be disposed at a partially recessed mounting position in a ceiling. An interior recess 150 of the troffer 148 having a pyramidal shape is formed by first and second top panels 152*a*, 152*b* meeting at the center line 146 along with first and second side panels 154*a*, 154*b*. The optical waveguide 142 may be about six inches in the x-dimension (FIG. 8), and the depth of the interior recess 150 may be approximately the same as the x-dimension of the waveguide 142. One or more LED element(s) or module(s) 106 are disposed within the troffer 148 along the center line 146 thereof for directing light into a coupling edge 144 of the optical waveguide 142.

As discussed above with reference to the embodiments of FIGS. 1-7, an illumination pattern developed by the luminaire 140 may be customized. Referring now to FIG. 8, the optical waveguide 142 includes on left and right sides 156, 158 thereof extraction features 400 having one or more of the characteristics discussed with reference to FIGS. 2-4 for developing desired distributions of emitted light. For example the luminaire 140 may develop an illumination pattern such that a ratio of emitted light may be one-to-one for the left and right sides 156, 158 of the optical waveguide 142. Other lighting parameters may be similarly customized between the left and right sides 156, 158 according to desired characteristics such as intensity, illumination pattern, directionality, etc. Additionally, the left and right sides 156, 158 of the optical waveguide 142 may emit substantially collimated light in selected directions, such as, for example, at thirty degrees or forty-five degrees downward and away from the luminaire 140 in order to create a desired lighting distribution and/or directionality pattern. In example embodiments, the bottom edge 162 of the optical waveguide 142 may also emit some portion of the light coupled into said waveguide 142 such that the bottom edge 162 thereof glows and/or directs some light downward.

Furthermore, the left and right sides 156, 158 of the optical waveguide 142 may have the same or different emission patterns. By way of further example, the luminaire 140 may be disposed such that the right side 158 of the optical waveguide 142 faces a vertical wall 402 and the left side 156 of the optical waveguide 142 faces into an open indoor space. In this example, it may be desirable for the right side 158 to emit less light and direct said light relatively more downward, while the left side 156 emits more light and directs said light relatively more horizontally outward into the open indoor space.

FIGS. 9A and 9B depict another embodiment of a troffer-style luminaire 164 with four optical waveguides 166a-166d arranged side-by-side in a vertical position and suspended from above. A single extrusion elongate housing 168 may be mounted proximal a center line 178 within an interior recess 170 formed by four side panels 172a-172d along with top panels 174a-174c of a troffer 176. Inner portions of such top panels 174a-174c and side panels 172a-172d may be painted or coated with a reflective material (specular or diffuse) or another desired covering to achieve a desired optical distribution. Each of the four optical waveguides 166a-166d may be suspended from a coupling edge 180a-180d thereof. Brackets 181 may be mounted to the elongate housing 168 and arranged between the individual optical waveguides 166a-166d to provide additional structural support and alignment thereto. One or more LED element(s) or module(s) 106 are disposed within the elongate housing 168 along the center line 178 of the troffer 176 for coupling light into coupling edges 180a-180d of the optical waveguides 166a-166d, respectively.

As seen in FIG. 9A, each optical waveguide 166a-166d may be about two inches in the x-dimension, about one foot in the y-dimension, and a depth of the interior recess 170 may be approximately the same or larger than the x-dimension of the waveguides 166a-166d. The elongate housing 168 may be formed from plastic, glass, metal, or some combination thereof. For example, the housing 168 may be fabricated from a single extrusion of one or more polymers to form the entire length thereof. The luminaire 164 may be about four feet in the y-dimension by about two feet in the z-dimension. Moreover, the dimensions of the optical waveguides 166a-166d may be subject to modification, and further, may be customized to fit different troffer-style luminaire configurations and/or sizes.

Each of the optical waveguides 166a-166d includes on left and right sides 182a-182d, 184a-184d thereof extraction features 400 having one or more of the characteristics discussed with reference to FIGS. 2-4 for developing desired distributions of emitted light. For example, in order to achieve a desired illumination distribution, a ratio of emitted light may be one-to-one for the respective left and right sides 182a-182d, 184a-184d of the optical waveguides 166a-166d. Additionally, the left and right sides 182a-182d, 184a-184d of the optical waveguides 166a-166d may emit light in selected directions, such as, for example, at thirty degrees or forty-five degrees downward and away from the luminaire 140. In example embodiments, the bottom edges 186a-186d of the optical waveguides 166a-166d may also emit some portion of light such that said bottom edges 186a-186d glow and/or direct some light downward.

Furthermore, the left and right sides 182a-182d, 184a-184d of the optical waveguides 166a-166d may have the same or different emission patterns having one or more directional components. By way of further examples, the luminaire 164 may be configured such that each of the individual optical waveguides 166a-166d has a different light emission pattern from all other waveguides, each of some of the waveguides (e.g., every other of the individual optical waveguides 166a-166d) has a first light emission pattern while each of one or more of the remaining waveguides 166 has a second light emission pattern different than the first light emission pattern, or only one of the optical waveguides 166a-166d has a different light emission pattern relative to the other optical waveguides 166a-166d. In a specific example, it may be desirable for the optical waveguides 166a, 166d on either end 188a, 188b of the troffer-style luminaire 164 to direct light relatively more horizontally outward from the luminaire 164 toward the nearest end thereof 188a, 188b, while the interior optical waveguides 166b, 166c direct light relatively more downward and below the luminaire 164. Such a configuration of optical waveguides may form a desirable illumination pattern for lighting an open indoor/outdoor/enclosed space such as an office or warehouse while also adequately lighting the floor immediately underneath the troffer-style luminaire 164.

As with other embodiments described herein, the optical waveguides 166a-166d are modular and interchangeable, such that one may be switched for another and/or such that the optical waveguides 166a-166d may be replaced with relative ease. Given that each optical waveguide 166a-166d of the luminaire 164 may produce any customizable illumination pattern and that each optical waveguide 166a-166d is modular, such waveguides may be easily interchanged and selected to produce customizable overall illumination patterns for the luminaire 164 according to parameters suitable for a given indoor/outdoor/enclosed lighting application or simply according to the desired characteristics.

Referring now to FIGS. 10A and 10B, another embodiment of a troffer-style luminaire 192 is illustrated with eight optical waveguides 194a-194h. Single extrusion elongate housings 196a, 196b may be mounted within an interior recess 198 formed by four side panels 200a-200d along with top panels 202a-202c of a troffer 204. In the depicted embodiment, the first and second elongate housings 196a, 196b are disposed on the opposing side panels 200b, 200d, respectively. These top panels 202a-202c and side panels 200a-200d may be painted or coated with reflective material or another desired covering as with previously described embodiments. The configuration of the optical waveguides 194a-194h and the elongate housings 196a, 196b respectively associated therewith is substantially identical to a wall fixture embodiment described hereinbelow with reference to FIGS. 12A and 12B. Additionally, as described hereinabove, the optical waveguides 194a-194b are interchangeable and modular, having the characteristics associated with such feature and described in detail with reference to previous embodiments.

Figure 11A:
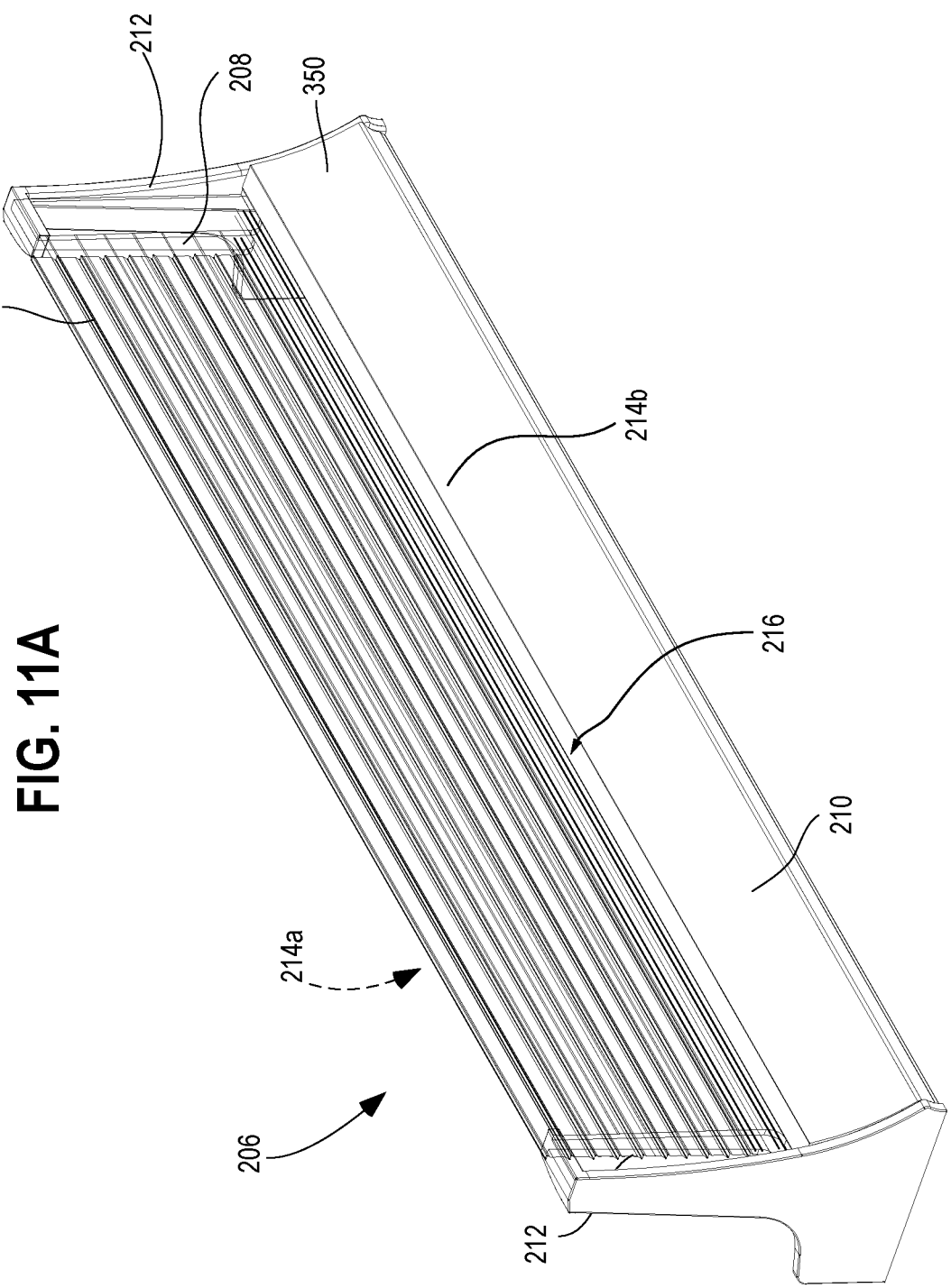
FIG. 11A is an isometric view from below of a luminaire that comprises an optical waveguide in a wall sconce configuration.

Referring now to FIGS. 11A and 11B, an embodiment of a wall sconce luminaire 206 with a single optical waveguide 208 is shown. The wall sconce 206 and optical waveguide 208 may be mounted to a wall, stud(s), or other suitable structure in either a vertical or a horizontal orientation. The wall sconce 206 includes an elongate housing 210 with support brackets 212 disposed on either end thereof. The optical waveguide 208 may be about two inches in the x-dimension and about one foot in the y-dimension (FIG. 11A). The elongate housing 210 may be formed from plastic, glass, metal, or some combination thereof and/or may be fabricated from a single extrusion of one or more polymers to form the entire length thereof. However, dimensions of the optical waveguide 208 may be subject to modification, and further, may be customized to fit different wall sconce sizes and applications. As in the other embodiments disclosed herein, the elongate housing 210 may include, among other things, one or more of driver circuitry, light emitting diode(s), control circuitry, sensor(s), power circuitry, circuit board(s), or other components. The wall sconce 206 comprises one or more LED elements or modules 106, as discussed hereinabove, arranged to direct light into a coupling end 216 of the optical waveguide 208.

As with previous embodiments, the optical waveguide 210 includes on upper and lower sides 214*a*, 214*b* thereof extraction features 400 having one or more of the characteristics discussed with reference to FIGS. 2-4 for developing desired distributions of emitted light. The illumination patterns emitted by the single optical waveguide 208 may be symmetrical and equal in the example embodiment shown in FIGS. 11A and 11B. As with other embodiments described herein, the optical waveguide 208 is modular and interchangeable, such that it may be substituted for an alternative waveguide having different extraction features and/or may be replaced with relative ease. Therefore, the waveguide 208 may be easily changed and selected to produce customizable overall illumination patterns for the wall sconce 206 according to parameters suitable for a particular indoor/outdoor/enclosed lighting application or simply according to desired characteristics. By way of example, the optical waveguide 210 may include a directed illumination pattern suitable for task lighting such that the wall sconce 206 may be mounted above a desk or workstation to provide lighting therefor.

Figure 12A:
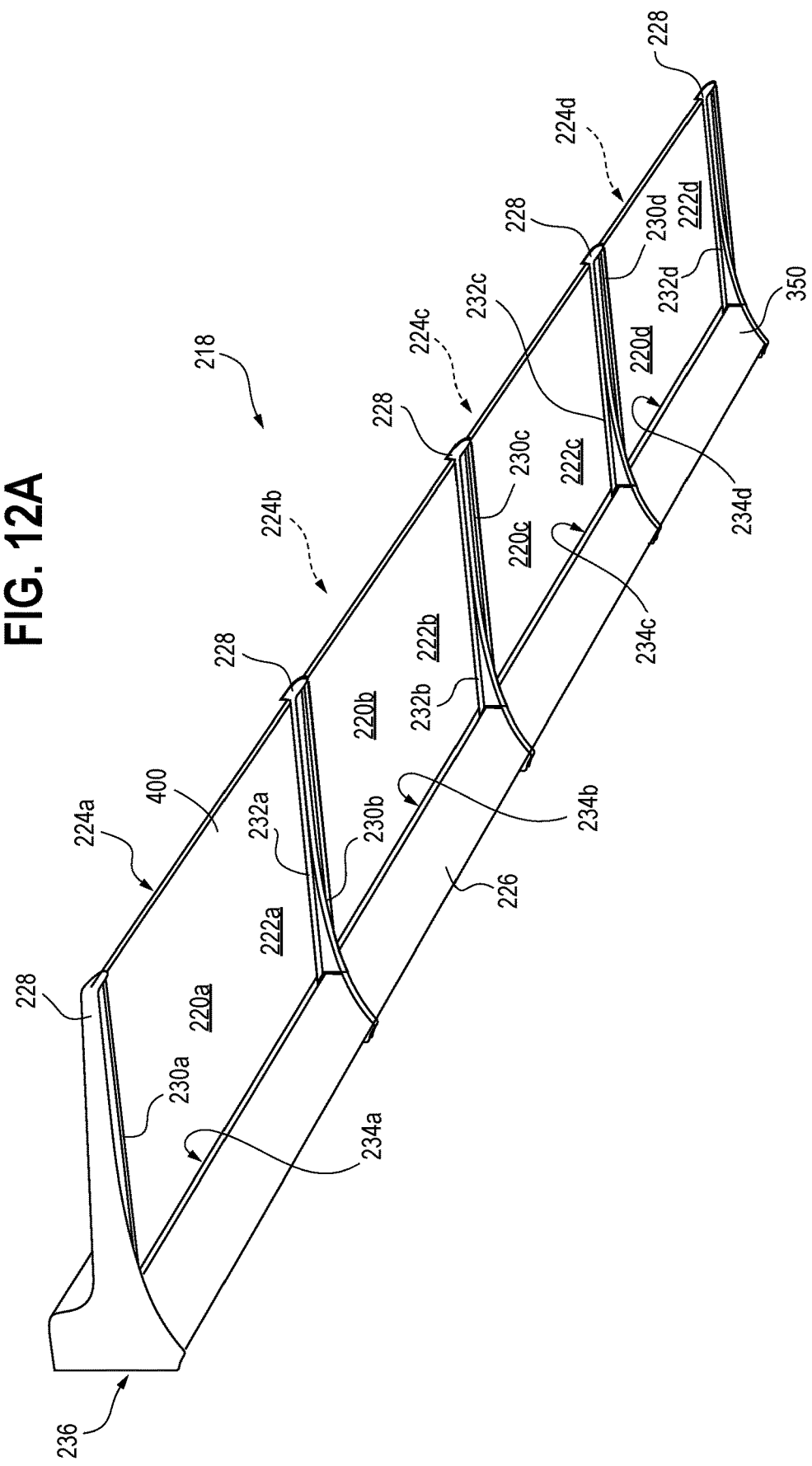
FIG. 12A is an isometric view from below of a luminaire that comprises a plurality of optical waveguides in a wall fixture configuration.
Figure 12B:
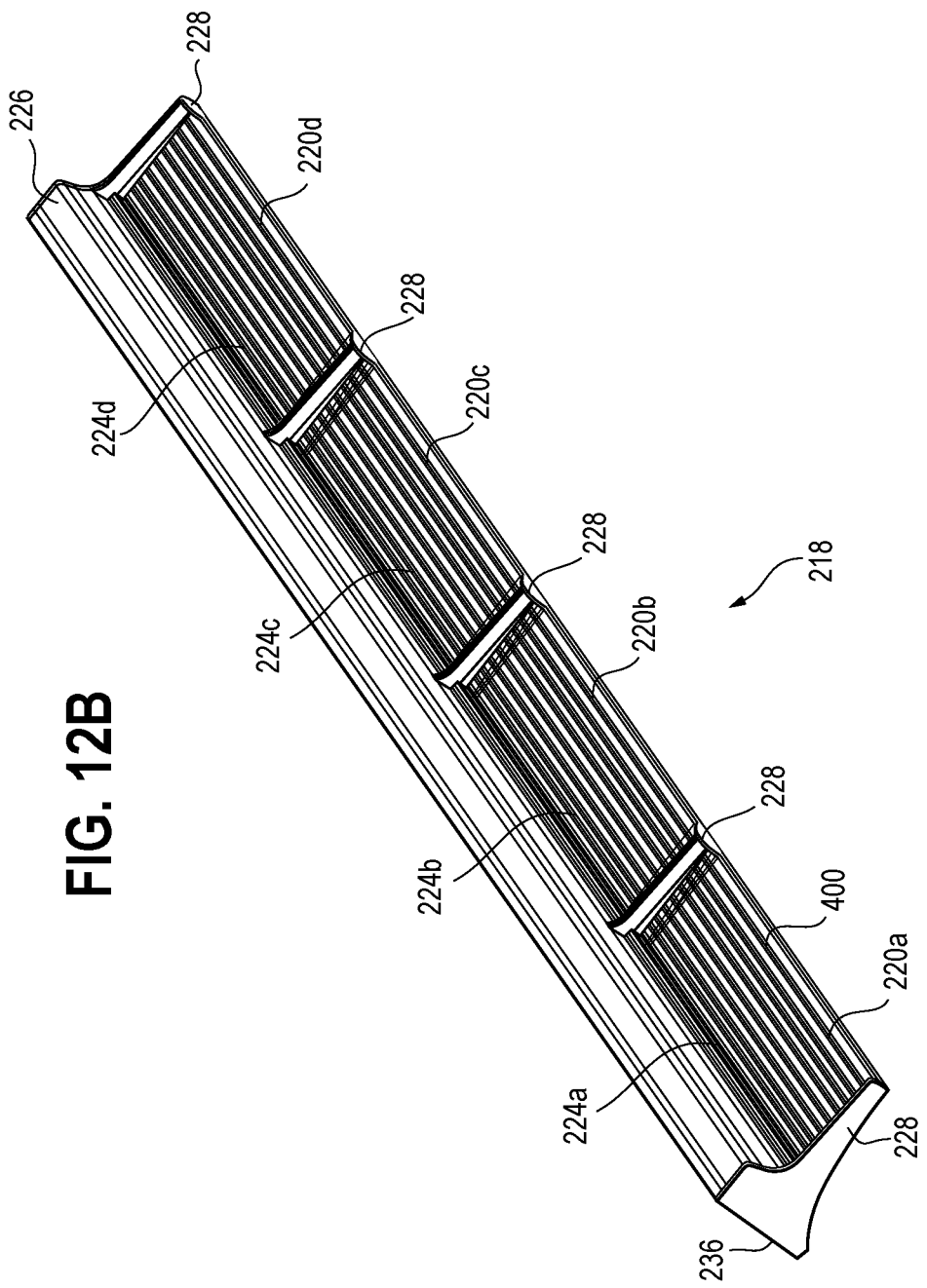
FIG. 12B is an isometric view from above of the luminaire shown in FIG. 12A.

FIGS. 12A and 12B depict an embodiment of a wall fixture luminaire 218 with four optical waveguides 220*a*-220*d* arranged in a horizontal configuration. The wall fixture 218 and the optical waveguides 220*a*-220*d* may be mounted to a wall, stud(s), or other suitable structural mounting point 236 and, in this example embodiment, configured with a horizontal orientation such that a lower side 222*a*-222*d* of each optical waveguide 220*a*-220*d* faces generally downwards towards a floor or ground, and an upper side 224*a*-224*d* of each optical luminaire 220*a*-220*d* faces generally upwards, perhaps toward a ceiling, if indoors. The wall fixture 218 includes an elongate housing 226 with brackets 228 mounted thereto and arranged between the individual optical waveguides 220*a*-220*d* to provide additional structural support and alignment to first and second edges 230*a*-230*d*, 232*a*-232*d* of each waveguide 220*a*-220*d*. The optical waveguides 220*a*-220*d* may have dimensions similar or identical to or different than the optical waveguides 116*a*-116*h* described hereinabove with reference to FIG. 5. As in the other embodiments disclosed herein, the elongate housing 226 may be formed from plastic, glass, metal, or some combination of materials and/or may be fabricated from a single extrusion of one or more polymers to form the entire length thereof. However, dimensions of the optical waveguides 220*a*-220*d* may be subject to modification, and further, may be customized to fit different wall fixture sizes and configurations. The elongate housing 226 may enclose, among other things, one or more of driver circuitry, light emitting diode(s), control circuitry, sensor(s), power circuitry, circuit board(s), or other components. The wall fixture 218 comprises one or more LED elements or modules 106, as discussed hereinabove, arranged to direct light into a coupling end 234*a*-234*d* of each optical waveguide 220*a*-220*d*. Further, the housing 226 and brackets 228 provide support to the coupling ends 234*a*-234*d* and first and second edges 230*a*-230*d*, 232*a*-232*d*, respectively, to hold each optical waveguide 220*a*-220*d* out horizontally from the mounting point 236.

As with the other embodiments disclosed herein, the optical waveguides 220*a*-220*d* include extraction features 400 on the lower and upper surfaces 222*a*-222*d*, 224*a*-224*d* thereof, having one or more of the characteristics discussed with reference to FIGS. 2-4, for developing desired distributions of emitted light. For example, the illumination patterns emitted by the optical waveguides 220*a*-220*d* of the wall fixture luminaire 218 may provide an overall illumination pattern that directs about eighty percent of the emitted light downward and away from the luminaire 218 and about twenty percent of the emitted light upward and away from the luminaire 218. Such an example illumination pattern may be suitable for mounting the wall fixture luminaire 218 on one or more vertical walls surrounding a large, indoor/outdoor/enclosed space, and/or for mounting along vertical walls of a hallway.

As with other embodiments described herein, the optical waveguides 220*a*-220*d* are modular and interchangeable, such that each may be switched for an alternative waveguide having different extraction features and/or may be replaced with relative ease. Therefore, the waveguides 220*a*-220*d* may be easily changed and selected to produce customizable overall illumination patterns for the wall fixture luminaire 218 according to parameters suitable for a particular indoor lighting application or simply according to desired characteristics.

Referring now to FIG. 13A, an embodiment of a luminaire 254 with one optical waveguide 256 is disposed in a vertical configuration. This luminaire embodiment 254 may be similar to the wall sconce luminaire 206 (FIG. 11A) and housing and mounting features thereof are substantially or completely the same, except as noted hereafter. The luminaire 254 may have a housing 258 that is elongate and rectangular in cross section. In the absence of structural arms or brackets as described with reference to previous embodiments, the housing 258 comprises the sole support for the optical waveguide 256. The resulting luminaire 254 presents the optical waveguide 256 as unrestricted on edge surfaces 263, 264, 265 thereof, except for a coupling end 260 that is disposed within the housing 256 and supported thereby. The remaining edge surfaces 263, 264, 265 of the optical waveguide are exposed and a portion of light coupled into the waveguide 256 may be emitted from said edge surfaces 263, 264, 265. The exposed edge surfaces 263, 264, 265 may be desirable for architectural purposes.

The housing 258 may be mounted from a ceiling 269 or wall 266 in the depicted embodiment. FIG. 13B depicts a plurality of luminaires 254*a*-254*e* arranged side-by-side. In this embodiment, the edge surfaces 265*a*, 263*b*, 265*b*, 263*c*, 265*c*, 263*d*, 265*d*, 263*e* may abut one another or may have a small gap disposed therebetween. An example embodiment wherein adjacent optical waveguides 256*a*, 256*b*, 256*c* . . . , are in optical communication with one another is also contemplated. In such an embodiment, light may not be exclusively emitted from edge surface 263, 265 of each optical waveguide 256, but instead may be coupled into the adjacent optical waveguide 256*a*, 256*b*, 256*c* . . . , for eventual emission. Similarly, the housings 258*a*, 258*b*, 258*c* . . . , may abut one another. Alternatively, the housings 258a, 258b, 258c . . . , may instead be formed as a single housing having a plurality of optical waveguides arranged therealong similar or identical to the embodiment of FIGS. 12A and 12B.

Figure 14C:
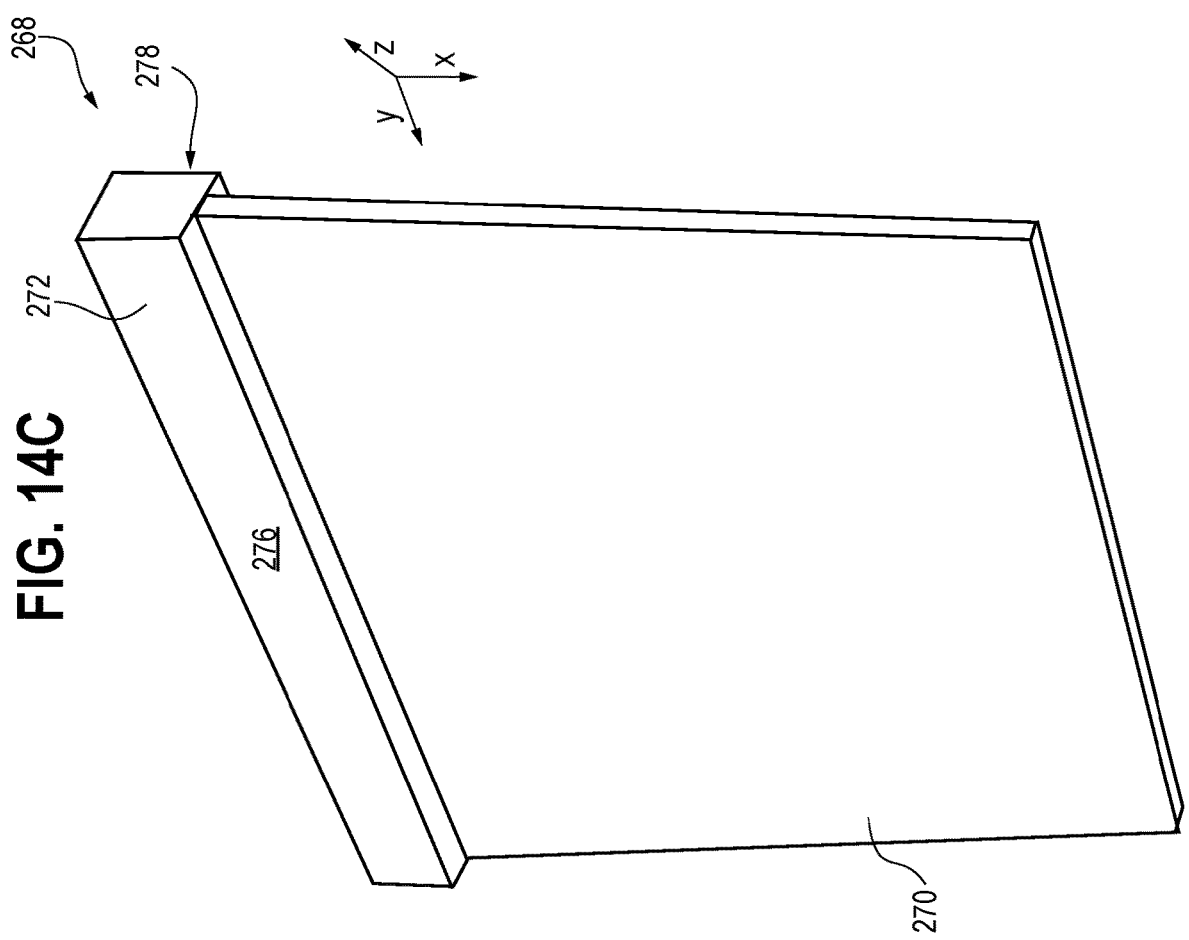
FIG. 14C is a side isometric view of an embodiment of a luminaire similar to that shown in FIG. 14A that comprises a tapered optical waveguide.
Figure 17:
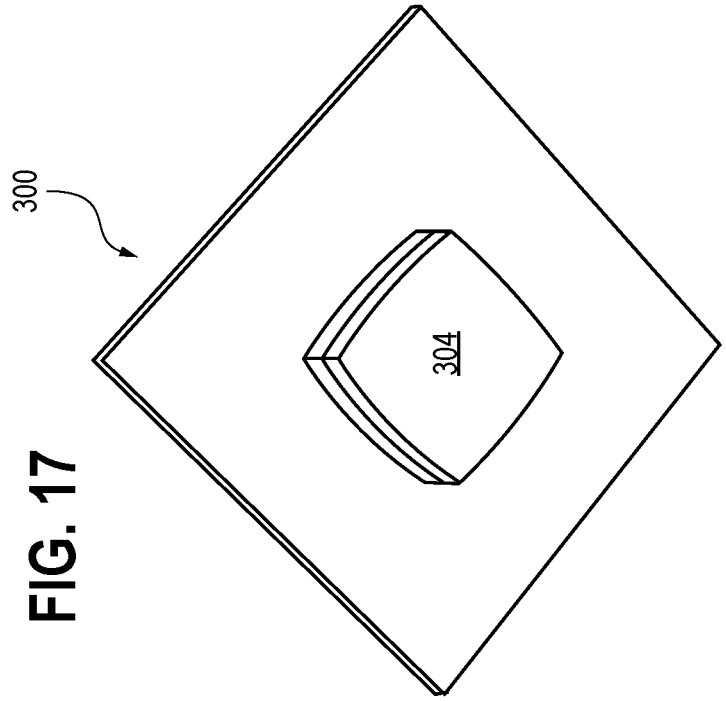
FIG. 17 is an isometric view from below of another embodiment of a luminaire that comprises a plurality of optical waveguides arranged in a square configuration.
Figure 18:
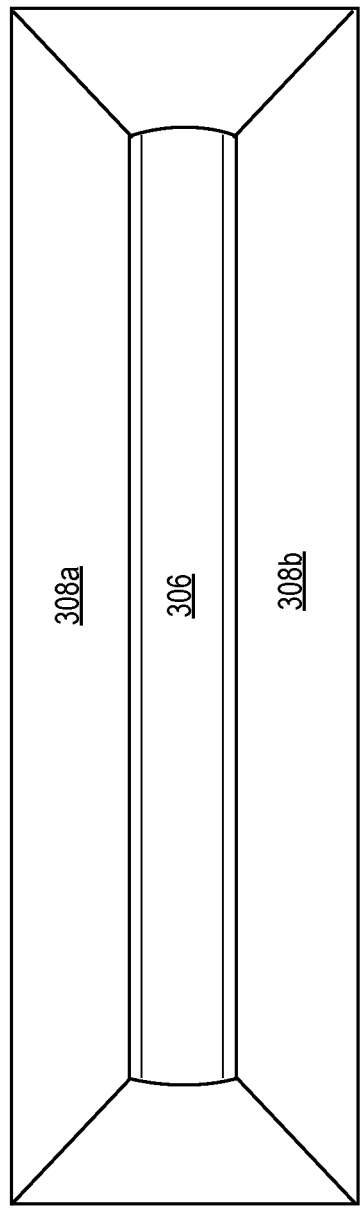
FIG. 18 is a bottom elevational view of another embodiment of a luminaire that comprises a plurality of optical waveguides arranged in an elongated configuration.
Figure 23:
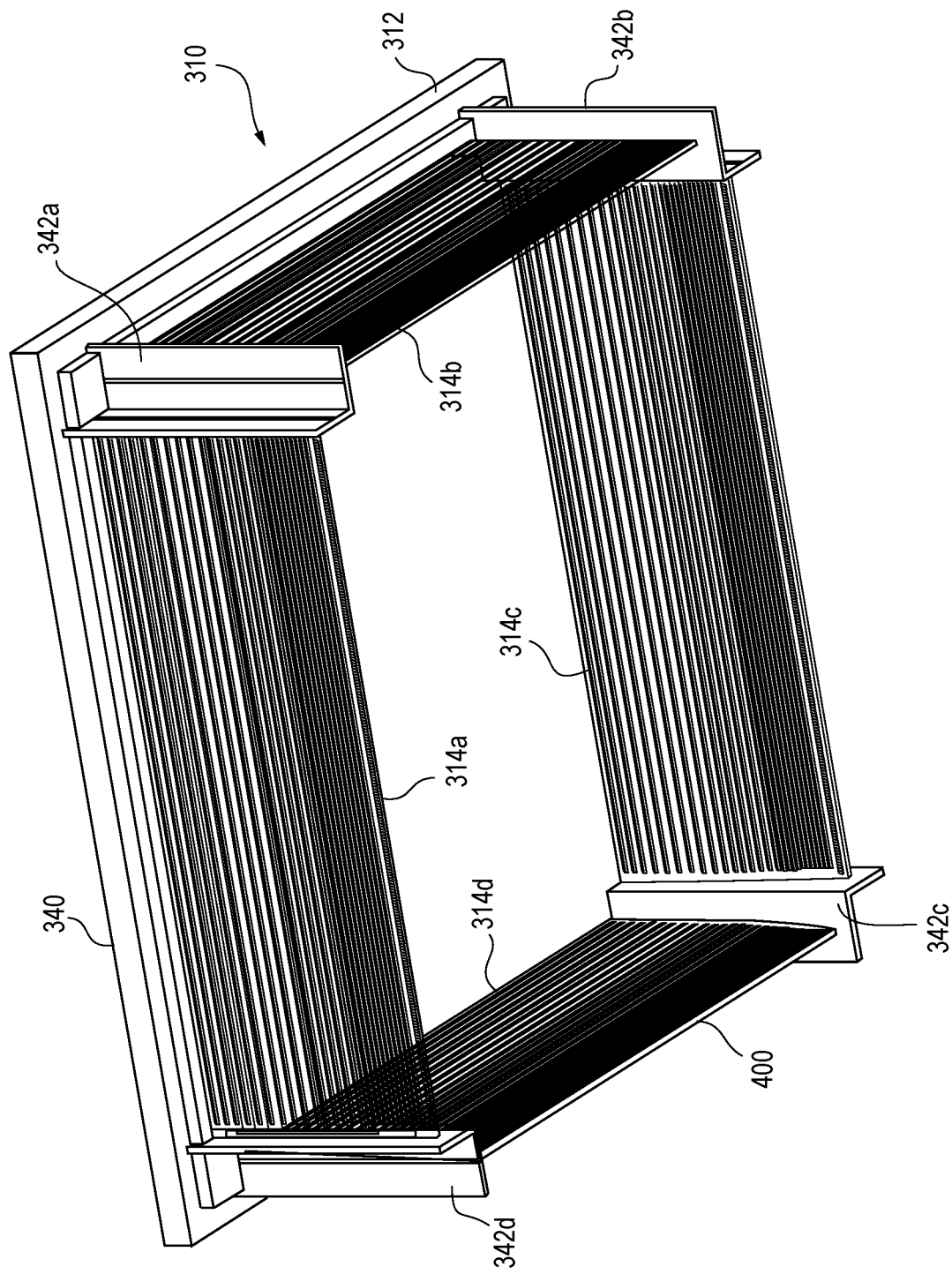
FIG. 23 is an isometric view from below of an indoor luminaire comprising a plurality of optical waveguides in a square configuration.
Figure 24:
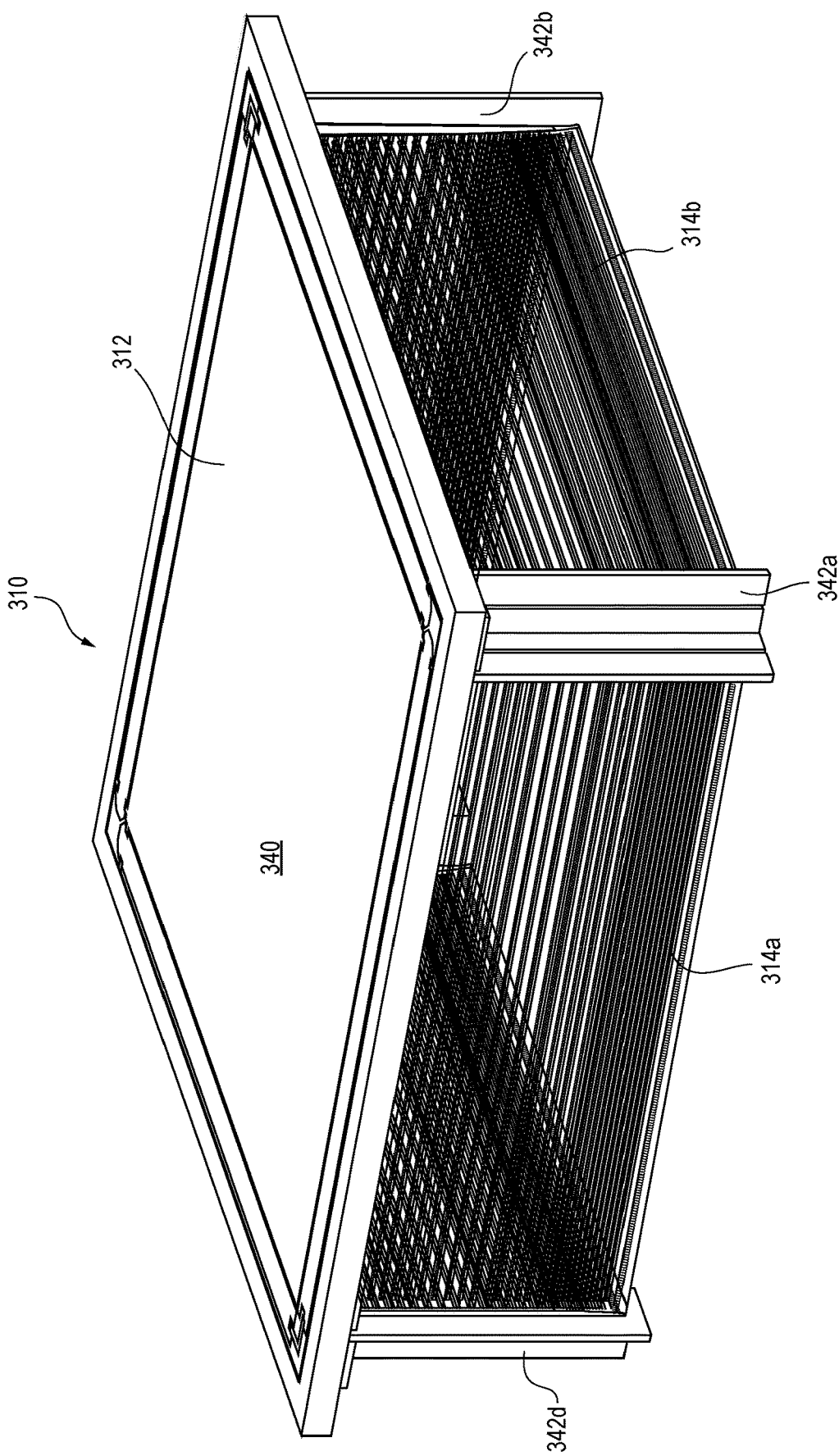
FIG. 24 is an isometric view from above of the luminaire of FIG. 23.
Figure 25:
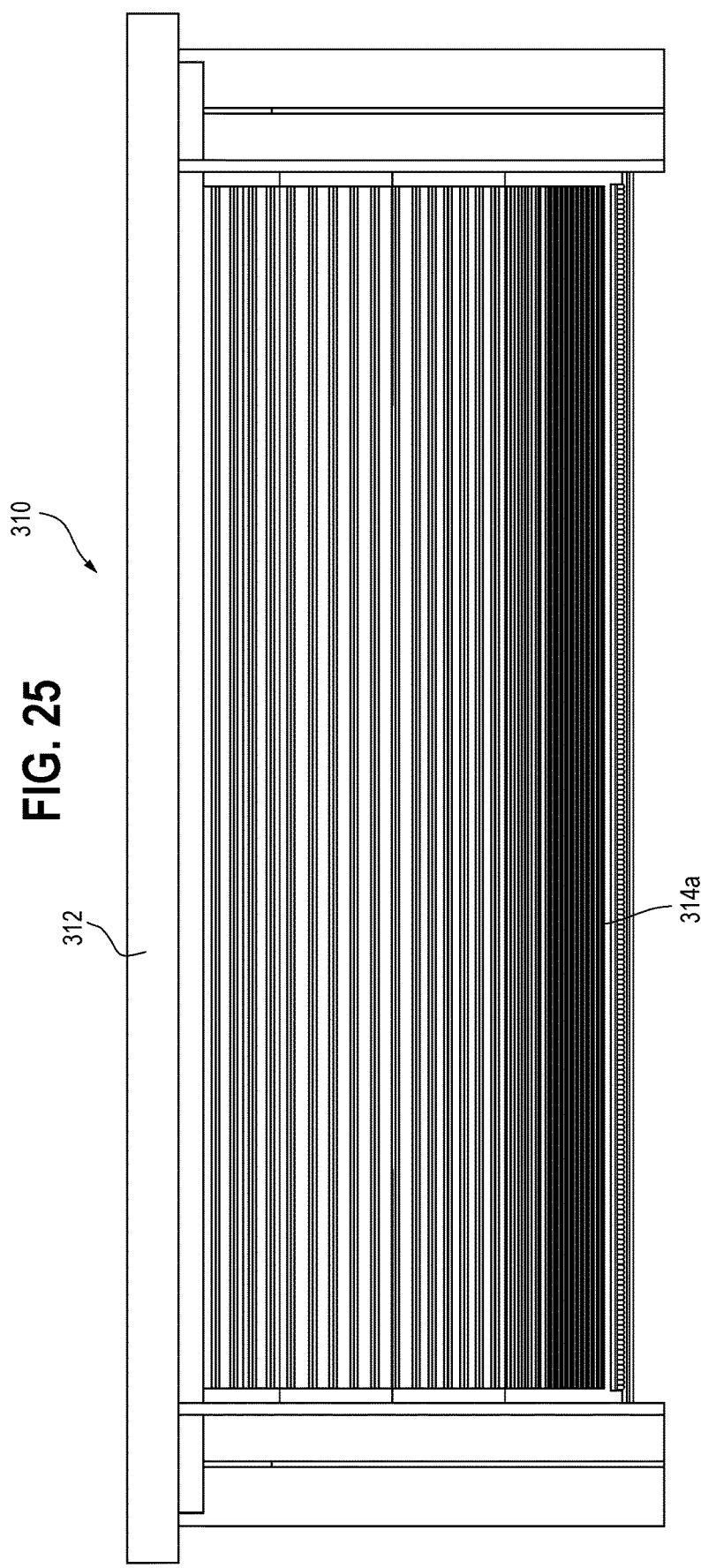
FIG. 25 is a front elevational view of the luminaire of FIG. 23, the back elevational, right side elevational, and left side elevational views of such luminaire being identical or similar thereto.
Figure 26:
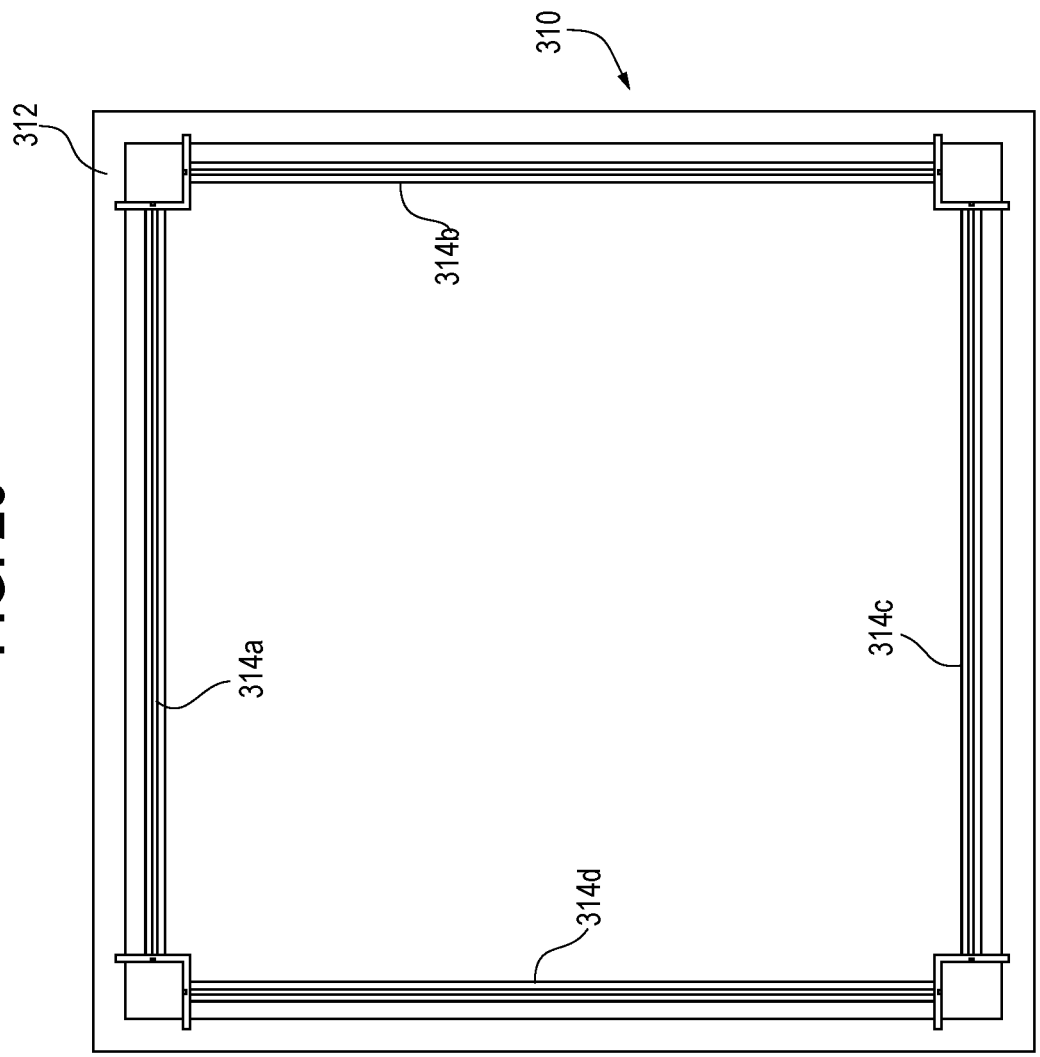
FIG. 26 is a bottom elevational view of the luminaire of FIG. 23.
Figure 27:
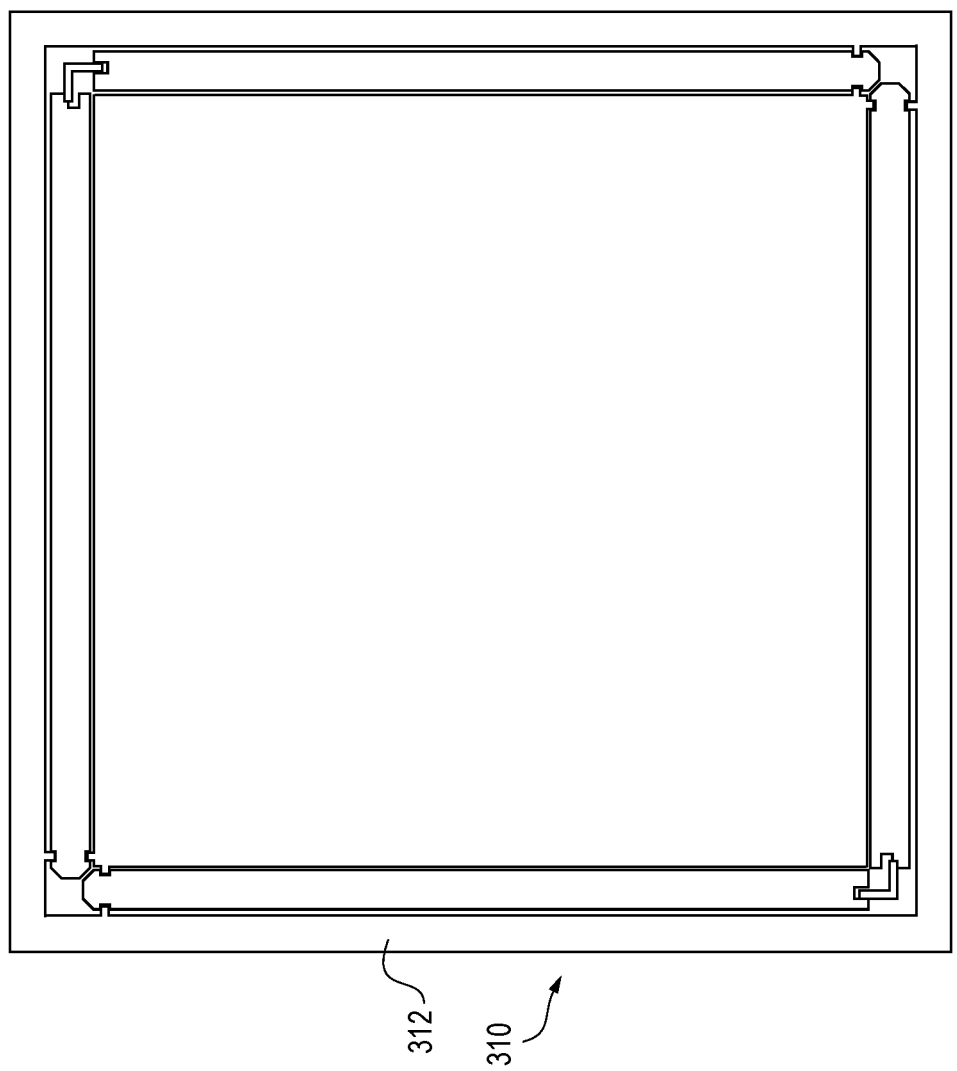
FIG. 27 is a plan view of the luminaire of FIG. 23.

FIGS. 14A and 14B depict an embodiment of a luminaire 268 with one optical waveguide 270, similar in configuration to the luminaire 254 of FIG. 13A. The luminaire 268 includes an elongate housing 272 that is rectangular in cross section; however, the optical waveguide 270 in this example is disposed off-center within the housing 272. As depicted, the luminaire 268 is mounted to a ceiling 274, and the optical waveguide 270 is mounted to the housing 272 proximal a first side 276 thereof opposite a second side 278 of the housing 272 that is mounted to the ceiling 274. The overall shape of the luminaire 268 may be relatively less elongate as compared with the luminaire 254 of FIG. 13A. To achieve such a difference in format, the housing 272 as shown in FIGS. 14A and 14B is relatively shorter along a y-dimension (FIG. 14B) thereof. Moreover, the optical waveguide 270 is relatively shorter along the same y-dimension, while being relatively longer along the x-dimension. As previously mentioned, modification of the overall size and shape of waveguides and housings is contemplated throughout this disclosure. FIG. 14C depicts an embodiment of the luminaire 268 wherein the optical waveguide 270 is disposed nearly centered between the first side 276 and the second side 278 of the housing 272. The luminaire 268 may be mounted to a wall or ceiling with the optical waveguide 270 arranged in either a horizontal or vertical orientation. Further, the optical waveguide 270 shown in FIGS. 14A-14C may be of substantially uniform thickness throughout (z-dimension) or, instead, may taper with increasing distance from the housing 272.

A luminaire 284 depicted in FIGS. 15A and 15B includes a square and/or rectangular housing 286 having exterior sides 288a-288d. Optical waveguides 290a-290d are disposed along the respective exterior sides 288a-288d of the housing 286. As with other embodiments, the housing 286 may include, among other things, one or more of driver circuitry, light emitting diode(s), control circuitry, sensor(s), power circuitry, circuit board(s), or other components. In the embodiment shown in FIG. 15A, one or more LED elements or modules 106 are disposed within the housing 286 adjacent each of the plurality of optical waveguides 290a-290d such that light emitted by the LEDs is directed outwardly from the sides 288a-288d and into coupling members of the optical waveguides 290a-290d along coupling ends, respectively, thereof.

With specific reference to FIG. 15A, the housing 286 has an open interior portion 292 such that space in the center of the housing is open to a ceiling or wall providing a unique aesthetic. The open interior portion 292 further provides for unique illumination patterns, if desirable. Equipment for suspension or mounting (not shown) the luminaire 284 may be included on one or more of upper and lower surfaces 294a, 294b of the housing 286 (FIG. 15B). The upper and lower surfaces 294a, 294b may be substantially planar, or instead may be arcuate depending on spatial constraints for components disposed within the housing 286 or for architectural purposes.

In the example of FIGS. 15A, 15B, given that optical waveguides 290a-290d are disposed along each of the exterior sides 288a-288d, the housing components 286 of the luminaire 284 are surrounded by optical waveguides 290a-290d. Such an arrangement provides for a desirable aesthetic as well as desirable illumination patterns wherein no housing portion blocks the outward distribution of light from the luminaire 286. As discussed with reference to the remaining embodiments, the optical waveguides 290a-290d may have extraction features and/or texturing disposed thereon to produce a variety of desirable light emission patterns. Further, the optical waveguides 290a-290d shown in the example embodiments of FIGS. 15A-18, while generally having many of the qualities of optical waveguides discussed hereinabove; such waveguides 290a-290d have a generally trapezoidal shape, or, more particularly as depicted, each of the waveguides 290a-290d may have the shape of an isosceles trapezoid. The optical waveguides 290a-290d may either abut one another, a gap may be present between each optical waveguide, or a structural member extending from the housing 286 may be disposed therebetween. As with all the embodiments disclosed herein, the optical waveguides 290a-290d may be interchangeable and modular such that one may be switched with or replaced by another.

Referring now to FIG. 16, the luminaire 284 may be elongate along a dimension thereof to form a rectangular luminaire 296 having six optical waveguides 298a-298f disposed thereabout. Along the elongate dimension, smaller housing portions 402, 404, which may include LED element(s) or modules(s) and/or circuitry and/or may have architectural purposes, are arranged between the optical waveguides 298a, 298b, 298d, 298e providing spacing therebetween. Such a configuration may provide for alternative illumination distributions by including additional optical waveguides. Further luminaire configurations including any further number of optical waveguides are also contemplated. The specifications of a particular lighting application may be used to dictate the size of a luminaire, in the spirit of those embodiments depicted herein, as well as the number of optical waveguides disposed thereabout.

Luminaire 300 (FIG. 17) and luminaire 302 (FIG. 18) are similar or identical to the embodiments shown in FIGS. 15A-16, except that the open interior portion is not present. Specifically, the housing 304 of luminaire 300 is either solid throughout or includes an enclosure therein that provides additional space within the housing for circuitry, LED driver(s), sensors, controller(s), etc. A housing 306 of luminaire 302 is an elongate embodiment of the housing 304. Further shown in the embodiment of FIG. 18, optical waveguides 308a, 308b disposed thereabout may be elongate along with the associated housing 306. As with the embodiments of FIGS. 15A-16, these example luminaires 300, 302 feature optical waveguides disposed in a single plane.

FIG. 19 depicts a luminaire 316 in a wall sconce configuration with a housing 318 having first and second waveguides 320a, 320b extending therefrom. The first and second waveguides 320a, 320b may (but need not) be tapered if desirable for aesthetic or light emission purposes. The extraction features 400 may be disposed on one or both sides of said optical waveguides 320a, 320b. The housing 318 includes components such as those discussed hereinabove with respect to other housing embodiments, including one or more LED element(s) or module(s) 106. In this embodiment, the first waveguide 320a points relatively upward from the horizontally aligned housing 318, while the second waveguide 320b points relatively downward from the housing 318. The first waveguide 320a directs light relatively upward while the second waveguide 320b directs light relatively downward. According to such a configuration, the luminaire 316 provides general lighting to a floor and a room from a wall mounted position. The optical waveguides 320a, 320b may have rounded exterior edges

322a, 322b and an arcuate profile in cross section. The rounded features may contribute to light distribution properties of the luminaire 316 as well as aesthetic or architectural properties thereof. A luminaire 324 depicted in FIG. 21 has a configuration similar to the luminaire 316, except that optical waveguides 326a, 326b disposed thereon are rectangular, tapered panels such as the optical waveguides depicted in FIGS. 14A-14C.

FIG. 20 depicts a luminaire 328 in a wall sconce configuration with first and second housings 330a, 330b disposed on either end of an elongate optical waveguide 332. Light may be coupled into the optical waveguide 332 from one or both ends thereof by one or more LED module(s) or element(s) disposed in the first and/or second housings 330a, 330b. The luminaire 328 in FIG. 20 may be mounted to a wall or ceiling by one or both of the first and second housings 330a, 330b.

The luminaire 334 depicted in FIG. 22 is a relatively smaller luminaire. The configuration of the luminaire 334 may be substantially identical to previous configurations described hereinabove except that all components thereof are scaled down. This luminaire 334 may be suitable for path lighting such as along a walkway or hallway, either indoors or outdoors. The luminaire 334 may be mounted to walls, baseboards, poles, and/or other suitable mounting locations.

FIGS. 23-27 depict another embodiment of a luminaire 310 comprising a housing 312 that includes support structures. A first plurality of optical waveguides 314a-314d is disposed on and supported by the housing 312. A second plurality of LED elements or modules 106 is supported by the housing 312 in a generally square sidewall-type configuration. A lid 340 and four structural corner members 342a-342d provide support to the optical waveguides 314a-314d. Suspension and/or mounting components may be located on the lid 340 or elsewhere on the housing 312.

In summary, the plurality of waveguides is disposed in and/or on the housing. A flex conductor or circuit boards are placed adjacent the top edges of the waveguides and the flex conductor or circuit boards are enclosed by the housing.

The housing and waveguides are joined to form the sides of the luminaire and integrate the enclosure for the power supply, sensor, operating circuits, and wire connection area. The continuous flex conductor or circuit boards present the LEDs to the waveguide coupling members.

The housing provides a unique aesthetic in which optical waveguides serve as substantial components, e.g., the sides, of the luminaire. Material and costs associated with the luminaire are minimized. The design results in superior lighting with minimal glare. The optic feature of the fixture is integrated onto and/or into the main housing, which results in a more robust structure and aids in the sealing between components.

The waveguide optics allow high lumen output with low glare. This is accomplished by directing the light downward at an angle and spreading the illumination across a large area. The light from the LED's is pointed directly into each waveguide as opposed to being bounced off a reflective surface of a reflector (i.e., indirect illumination). This optical solution is more efficient than current indirect systems and allows the glare value to be adjusted by changing the illuminated area.

In an embodiment, each waveguide is made of optical grade acrylic and the LED's are optically coupled to the waveguide using a liquid silicone rubber ("LSR") member or other coupling member. The coupling member is shaped to serve as the entrance geometry for the optical system by directing light from the LED's directly into the waveguide.

If desired, the waveguides (with or without the optical coupling members) may be insert molded with the housing, thereby making the waveguide and housing a single piece and eliminating the need for seals between the waveguides and the housing. This reduces assembly time and makes for a more robust luminaire structure. In a specific version of the embodiment, a thermoplastic elastomer ("TPE") seal is molded onto the housing to seal the fixture and protect the LED's and related circuitry from the environment. In yet another embodiment, the TPE seal is molded onto a top plate or lid that is placed on top of the housing. In still further embodiments discussed herein, the fixture is not sealed and the waveguides thereof are modular and interchangeable, increasing the relative ease with which waveguides are replaced, such as if broken or worn, and/or overall illumination patterns are developed, customized, and/or changed.

The luminaire can be used with several installation options (e.g., pendant, trunnion, junction box, pole). The housing also results in ease of installation because waveguides may be easily removed and/or replaced.

Any of the embodiments disclosed herein may include a power circuit that may further be used with light control circuitry that controls color temperature of any of the embodiments disclosed herein in accordance with viewer input such as disclosed in U.S. patent application Ser. No. 14/292,286, filed May 30, 2014, now U.S. Pat. No. 10,278,250, entitled "Lighting Fixture Providing Variable CCT" by Pope et al., the disclosure of which is hereby incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are hereby incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

INDUSTRIAL APPLICABILITY

In summary, the disclosed luminaire provides an aesthetically pleasing, sturdy, cost effective lighting assembly for use in lighting a large area such as an office or warehouse spaces. The lighting is accomplished with reduced glare as compared to conventional lighting systems.

The extraction features disclosed herein efficiently extract light out of the waveguide. At least some of the luminaires disclosed herein are particularly adapted for use in installations, such as, replacement or retrofit lamps, outdoor products (e.g., streetlights, high-bay lights, canopy lights), and indoor products (e.g., downlights, troffers, a lay-in or drop-in application, a surface mount application onto a wall or ceiling, a suspended fixture, a wall sconce, etc.) preferably requiring a total luminaire output of at least about 800 lumens or greater, and, in some embodiments, a total luminaire output of at least about 7000 lumens, although the total luminaire output depends in part on the desired application. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 4000 degrees Kelvin and about 5000 degrees Kelvin. Also, at least some of the luminaires disclosed herein preferably exhibit an efficacy of at least about 100 lumens per watt, and more preferably at least about 120 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 80 being more preferable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present disclosure, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of mixing features, extraction features, and redirection features necessary to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

All references, including publications, patent applications, and patents, cited herein are hereby incorporated by reference to the same extent as if each reference were individually and specifically indicated to be incorporated by reference and were set forth in its entirety herein.

The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The use of the terms "a" and "an" and "the" and similar references in the context of the present disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A luminaire, comprising:
    a housing;
    at least one waveguide comprising first and second opposite waveguide ends, a coupling portion disposed at the first waveguide end, and a light emitting portion disposed between the first and second waveguide ends, the light emitting portion facing a first direction;
    at least one LED element disposed within the housing adjacent the coupling portion of the at least one waveguide, wherein the at least one waveguide provides a first illumination pattern and the at least one waveguide is interchangeable with at least one other waveguide that provides a second illumination pattern; and
    an optical waveguide having an interior surface, an exterior light emission surface and a coupling surface, the optical waveguide surrounding at least a portion of the housing that faces the first direction such that the interior surface faces the portion of the housing and the light emission surface is exposed, wherein a portion of light is emitted by the light emitting portion into the optical waveguide via the coupling surface and the exterior light emission surface develops a glowing appearance along the housing.

2. The luminaire of claim 1, wherein the first illumination pattern is different from the second illumination pattern.

3. The luminaire of claim 2, wherein the luminaire develops a luminaire illumination pattern, and wherein interchanging of the at least one waveguide with the at least one other waveguide modifies the luminaire illumination pattern.

4. The luminaire of claim 1, wherein:
    the at least one waveguide comprises a plurality of modular waveguides;
    a plurality of light extraction features are disposed on each of the plurality of modular waveguides; and
    the plurality of light extraction features disposed on each of the plurality of modular waveguides develops a respective light distribution associated with the corresponding modular waveguide.

5. The luminaire of claim 4, wherein one or more modular waveguides of the plurality of modular waveguides are interchangeable with one or more replacement modular waveguides.

6. The luminaire of claim 5, wherein the luminaire develops a luminaire illumination pattern and wherein the luminaire illumination pattern is modified by interchanging the one or more modular waveguides of the plurality of modular waveguides with the one or more replacement modular waveguides.

7. The luminaire of claim 6, wherein the one or more replacement modular waveguides are disposed within another luminaire.

8. The luminaire of claim 1, comprising an interior luminaire portion and an outer luminaire portion and wherein the first waveguide end is disposed adjacent the interior luminaire portion and the at least one waveguide extends out of and away from the housing to form the outer luminaire portion.

9. The luminaire of claim 8, wherein the outer luminaire portion at least partially surrounds the interior luminaire portion.

10. The luminaire of claim 1, wherein a first number of waveguides of the at least one waveguide is interchangeable with a second number of waveguides of the at least one other waveguide and wherein the first number and the second number are different.

11. A troffer-style luminaire, comprising:
    a troffer housing defining an interior recess and having a top panel, a first side panel, and a second side panel where the second side panel is opposed to the first side panel, the troffer housing being configured to be mounted in a ceiling, wherein the top panel defines a reflective surface;
    a first plurality of LEDs extending along at least a portion of the first side panel;
    a second plurality of LEDs extending along at least a portion of the second side panel;
    at least one first waveguide receiving light from the first plurality of LEDs, the at least one first waveguide extending from the first side panel such that the at least one first waveguide extends substantially horizontally below the top panel when the troffer housing is mounted in the ceiling; and
    at least one second waveguide receiving light from the second plurality of LEDs, the at least one second waveguide extending from the second side panel such that the at least one second waveguide extends substantially horizontally below the top panel when the troffer housing is mounted in the ceiling, wherein the at least one first waveguide and the at least one second waveguide are spaced from the reflective surface to define a space therebetween.

12. The troffer-style luminaire of claim 11 wherein the at least one first waveguide comprises a plurality of first waveguides arranged adjacent to one another along the first side.

13. The troffer-style luminaire of claim 12 wherein the at least one second waveguide comprises a plurality of second waveguides arranged adjacent to one another along the second side.

14. The troffer-style luminaire of claim 12 wherein an illumination pattern of the luminaire is modified by the interchanging of at least one first waveguide of the plurality of first waveguides with another first waveguide of the plurality of first waveguides.

15. The troffer-style luminaire of claim 11 wherein the at least one first waveguide and the at least one second waveguide are removable.

16. A troffer-style luminaire, comprising:
a troffer housing defining an interior recess having a first side and a second side where the second side is opposed to the first side, the troffer housing being configured to be mounted in a ceiling, wherein the troffer housing defines a reflective surface;
a plurality of first waveguides arranged in a side-by-side manner extending from the first side such that the plurality of first waveguides extend substantially horizontally when the troffer housing is mounted in the ceiling;
a plurality of second waveguides arranged in a side-by-side manner extending from the second side such that the plurality of second waveguides extend substantially horizontally when the troffer housing is mounted in the ceiling, wherein the plurality of first waveguides and the plurality of second waveguides are spaced from one another to define a space therebetween and at least a portion of light emitted by the plurality of first waveguides and the plurality of second waveguides is reflected off of the reflective surface; and
a plurality of first LEDs optically coupled to the plurality of first waveguides and a plurality of second LEDs optically coupled to the plurality of second waveguides.

17. The troffer-style luminaire of claim 16 wherein each of the plurality of first waveguides and the plurality of second waveguides includes a first light emitting surface and a second light emitting surface, wherein the first light emitting surface faces toward the troffer housing and the second light emitting surface faces away from the troffer housing.

18. The troffer-style luminaire of claim 16 wherein the first side has a first length and the second side has a second length and wherein the plurality of first waveguides extend along substantially the entire first length of the first side and the plurality of second waveguides extend along substantially the entire second length of the second side.

19. The troffer-style luminaire of claim 16, further comprising:
a plurality of light extraction features disposed on each of the plurality of first waveguides and the plurality of second waveguides; and
a first plurality of coupling features disposed on the plurality of first waveguides for optically coupling the plurality of first waveguides to the plurality of first LEDs and a second plurality of coupling features disposed on the plurality of second waveguides for optically coupling the plurality of second waveguides to the plurality of second LEDs.

20. The troffer-style luminaire of claim 19, wherein the plurality of light extraction features disposed on each of the plurality of first waveguides and the plurality of second waveguides develop a light distribution pattern.

21. The troffer-style luminaire of claim 16, wherein at least one of the plurality of first waveguides and at least one of the plurality of second waveguides are interchangeable with another one of the plurality of first waveguides and the plurality of second waveguides in the troffer housing.

22. The troffer-style luminaire of claim 16, wherein at least one of the plurality of first waveguides and the plurality of second waveguides is interchangeable with another one of the plurality of first waveguides and the plurality of second waveguides disposed at a different location on the troffer housing.

* * * * *